(12) United States Patent
Witman et al.

(10) Patent No.: US 11,102,938 B2
(45) Date of Patent: Aug. 31, 2021

(54) SOIL MODULE AND METHOD OF MANUFACTURE THEREOF

(71) Applicant: GrowSquares Inc., Brooklyn, NY (US)

(72) Inventors: Zachary Witman, New York, NY (US); John Dinning, Brooklyn, NY (US); Daeshuan Mcclintock, Brooklyn, NY (US)

(73) Assignee: Growsquares, Inc., Brooklyn, NY (US)

( * ) Notice: Subject to any disclaimer, the term of this patent is extended or adjusted under 35 U.S.C. 154(b) by 0 days.

(21) Appl. No.: 17/168,151

(22) Filed: Feb. 4, 2021

(65) Prior Publication Data

US 2021/0153441 A1    May 27, 2021

Related U.S. Application Data

(62) Division of application No. 16/182,974, filed on Nov. 7, 2018, now Pat. No. 10,945,382.

(60) Provisional application No. 62/582,882, filed on Nov. 7, 2017.

(51) Int. Cl.
| | |
|---|---|
| *A01G 9/029* | (2018.01) |
| *A01G 24/28* | (2018.01) |
| *A01G 24/46* | (2018.01) |
| *A01G 24/25* | (2018.01) |
| *B65D 65/46* | (2006.01) |

(52) U.S. Cl.
CPC ......... *A01G 9/0291* (2018.02); *A01G 9/0293* (2018.02); *A01G 24/25* (2018.02); *A01G 24/28* (2018.02); *A01G 24/46* (2018.02); *B65D 65/466* (2013.01)

(58) Field of Classification Search
CPC .......................... A01G 9/0291; A01G 9/0293
See application file for complete search history.

(56) References Cited

U.S. PATENT DOCUMENTS

| | | | | |
|---|---|---|---|---|
| 2,904,933 | A * | 9/1959 | King | A01G 5/04 47/41.12 |
| 5,241,784 | A * | 9/1993 | Henry | A01G 9/029 47/66.1 |
| 2003/0005865 | A1* | 1/2003 | Washburn | A01C 1/04 111/114 |
| 2004/0111967 | A1* | 6/2004 | Raap | A01G 9/029 47/74 |
| 2008/0046277 | A1* | 2/2008 | Stamets | G06Q 10/30 705/308 |
| 2011/0277381 | A1* | 11/2011 | Paternostre | A01G 9/021 47/66.7 |
| 2012/0220454 | A1* | 8/2012 | Chen | A01N 25/00 504/100 |
| 2015/0107155 | A1* | 4/2015 | Samet | A01G 9/021 47/66.7 |
| 2016/0262320 | A1* | 9/2016 | Ruys | A01G 22/00 |

* cited by examiner

*Primary Examiner* — Monica L Barlow
(74) *Attorney, Agent, or Firm* — Brooklyn Law Incubator and Policy Clinic; Serge Krimnus; Joshua English

(57) ABSTRACT

A self-contained soil module, the soil module including a biodegradable outer frame forming the shape of the soil module, a biodegradable wrapping disposed within the biodegradable outer frame, a soil composition contained within the biodegradable wrapping and at least one plant seed of at least one type of plant disposed within the soil module.

3 Claims, 32 Drawing Sheets

SOIL MODULE AND METHOD OF MANUFACTURE THEREOF

TECHNICAL FIELD OF THE INVENTION

The invention is related generally to the field of agriculture and, more particularly, to methods, articles of manufacture and compositions of matter to improve the efficiency of plant growth and growing environments.

INTRODUCTION

Urban gardeners have a difficult time gardening and report significant difficulty or dissatisfaction with their gardens. Even expert gardeners in urban areas can find they lack the knowledge of what plants to grow in their neighborhoods. Urban gardeners are faced with various difficulties in cultivating successful gardens including limited information about what plants will optimally grow in their neighborhood based on sunlight, wind, weather, soil conditions, and the like. In addition, gardeners often deal with limited space constraints. Small space for growing plants increases the difficulty of cultivating a garden and creates issues with raising plants next to one another that might not produce an optimal growing environment. In addition, urban growers as well as other gardeners face time constraints with cultivating their gardens and knowing what nutrients would optimize growing performance, when to water, when to harvest, etc.

There is a large part of the urban population that desires a personal garden either for herbs or vegetables, but the lack of time and expected difficulty of maintaining the garden prevents them from achieving this desire. Most urban gardeners participate in this activity for fun and do not have the desire or the ability to spend a large amount of time on their gardens. It is more of a recreational activity. Further, there are environmental complexities to attend to including the challenges of inconsistent light, wind, local and contextual complexities that make each urban garden site uniquely challenging.

In addition, there is a common problem of poor soil quality. Some types of plants grow more optimally in different soil compositions. However, when gardens are prepared, it is often the case that all plant types in a garden are planted and grown in the same soil composition regardless of plant type. This method deprives certain plants of the optimal conditions for growth. In addition, the underlying soil of a local area may lack or have an overabundance of certain soil components that may work to the advantage of some plants, disadvantage to others, or perhaps detrimentally affect the entire variety of plant life in the garden.

The solution to the above-identified problems is a soil module comprising seeds, soil, and nutrients all enclosed in a self-contained biodegradable outer frame. This module already contains the desired plant seeds selected by the end user. The soil composition contained within the module comprises optimal levels of soil amendments, bacteria, nutrients, and minerals specifically tailored to optimize the growth of the contained seeds. Each module in an embodiment comprises at least one seed type. The modular nature of these modules allows for each module to contain one seed type and then multiple modules can be arranged next to each other to create a garden with multiple plant types. The modules allow for each type of plant to be grown in a unique optimal soil composition while the garden as a whole can comprise a wide variety of plants. The modules are end user ready and all the user needs to do is place the modules in their respective gardening area.

Further disclosed herein in connection with the embodiments of the invention are methods of performing a microenvironment analysis to determine the types of plants that will optimally grow in a garden based on a wide variety of inputs including geographic location, sunlight, wind, cloud cover as well as underlying local soil compositions. Further, an embodiment of the invention disclosed herein provides for a recommendation engine that can provide an end user with suggestions regarding the plant life that will optimally grow in the user's selected garden area. Further, the layout of the garden is automatically configured for the end user so that plant types that have adverse effects when grown next to one another are configured in a way that avoids these adverse effects. Further, embodiments of the invention described herein automatically monitors the user's garden and provides for personalized watering and harvest notifications for each plant type. In addition, an imaging network is provided so that an end user can upload pictures of garden plants to the network, which automatically identifies troubleshooting and problem issues and proposes solutions to the end user. Although this application discusses urban growing environments, the embodiments disclosed herein are also applicable in suburban and rural environments.

Further disclosed herein is a system for selecting a soil delivery module, the system comprising: an end user terminal configured to accept as input from a user a size and a shape of a garden and a selection of at least one type of plant; a sensor configured to determine at least a geographic location and a sunlight profile of the garden; a transmitter configured to transmit at least the size and the shape of the garden, the geographic location of the garden and the sunlight profile of the garden to a computer network; a recommendation engine contained within the computer network configured to calculate plant life that will grow in the garden based on the geographic location and the sunlight profile of the garden; a configuration engine contained within the computer network configured to calculate an optimal placement of the at least one type of plant based at least on the size and the shape of the garden; and an optimization engine contained within the computer network configured for calculating an optimal soil composition for growing the at least one type of plant in the soil delivery module. The sensor of the system may comprise a smartphone device.

DETAILED DESCRIPTION

Figure 1A:
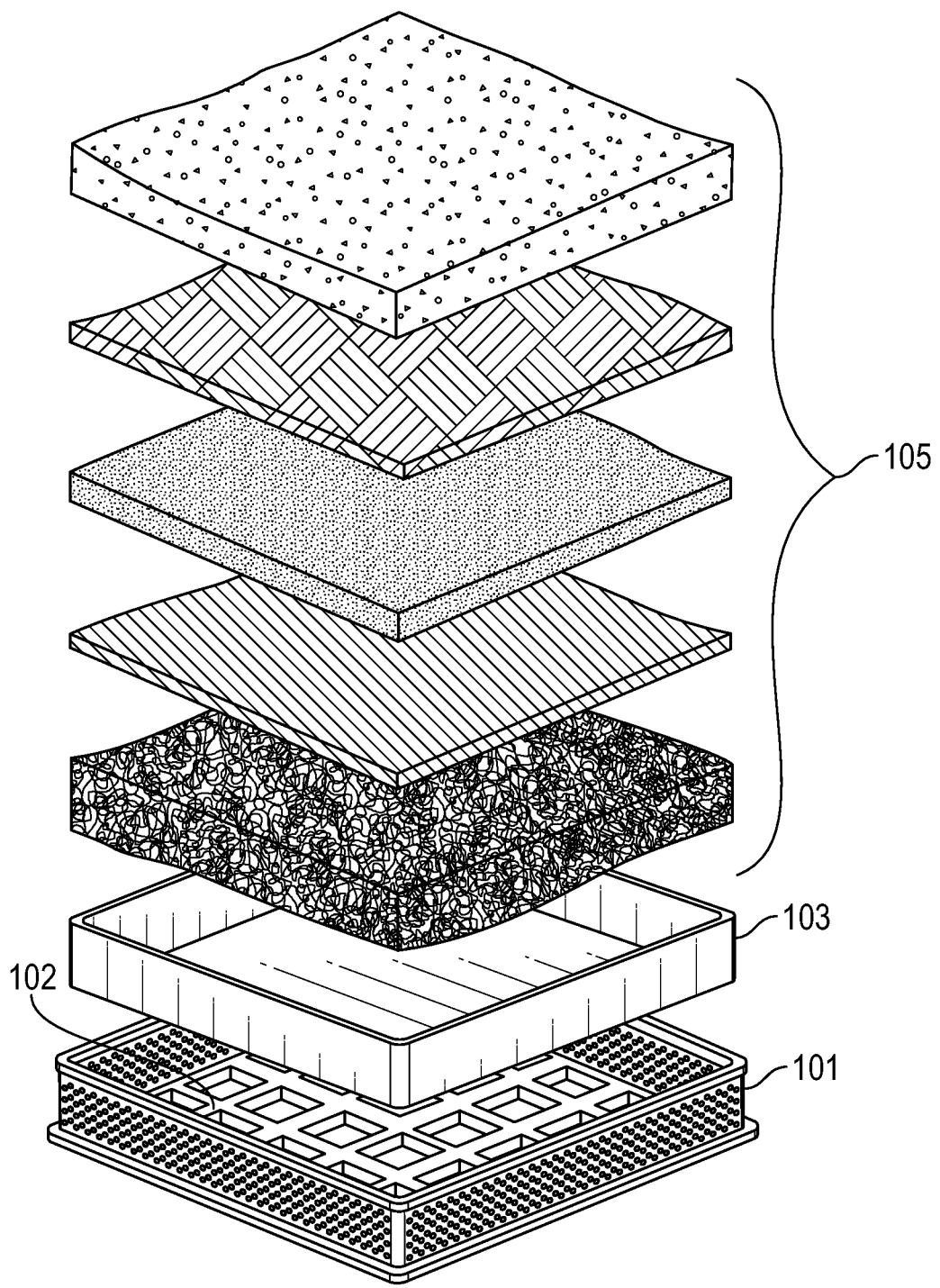
FIG. 1A-1B shows a cross-sectional view of the soil module and its components.

FIG. 1A shows a cross-sectional view of the soil module and its components. The layers shown in FIG. 1 are non-limiting and for illustrative purposes. The soil module comprises an outer frame 101, shown as the bottom layer in FIG. 1A. This outer frame 101 may be rigid and self-supporting, meaning it may be constructed to contain the weight of the internal components of the soil composition. In an embodiment, the outer frame 101 of the soil delivery module comprises a biodegradable substance. In an embodiment, this biodegradable substance comprises mycelium. When a biodegradable substance forms the outer layer of the soil module, plant roots can grow through the material, and in addition, the soil module becomes more convenient for use since no maintenance will be required to remove a non-biodegradable substance from a garden at a later stage. It is possible to construct the outer frame 101 from a non-biodegradable substance. The outer frame 101 can be constructed from mycelium, but in addition, from other biodegradable substances such as coco-coir, bagasse, paper pulp, and thermoplastic starch. The outer frame may comprise a grid structure 102 on the inner portion of bottom side of the outer frame.

The second layer from the bottom in FIG. 1A shows a thin biodegradable wrapping 103, which may be biodegradable paper, designed to form the inner layer of the soil module and contain the soil composition deposited within the soil module. The inner layer 103 may comprise, for example, cellulose paper.

The next five layers 105 shown in Figure Aare illustrative representations of the components of the soil composition contained within the soil module. These layers represent nutrients and minerals, cultured bacteria, a combination of soil amendments, capsaicin extract, and seeds of at least one variety of plant. In an embodiment each soil module contains one type of plant seed. The soil composition contained therein can be of a generic type suitable for most plant seeds to optimize growth. In an embodiment the soil composition contained within said soil module has been particularly configured to optimize the plant growth of the specific type of plant seed contained within the soil module. In an embodiment the soil composition is optimized to counteract any deficiencies in the soil composition of a local area wherein a garden area is selected and when the soil module is to be planted directly in the local soil.

In an embodiment the soil module comprises a cuboid shape having a top and bottom and four symmetric side walls. The modular nature of the self-contained soil module allows for multiple soil modules to be placed next to each other in a garden. The garden can comprise nearly any size or shape and be conveniently planted using said soil modules. When the components of the soil module are selected to be biodegradable, an end user merely must place the soil module in the desired location of the garden and water accordingly.

In an embodiment, a soil module (also referred to herein as a Grow Block) comprises the following measurements:

| GrowBlock | Dimensions: |
| --- | --- |
| Width (Inches): | 11.8 |
| Length (inches): | 11.8 |
| Depth (Inches): | 2.0 |
| Wall Thickness. | 0.2 |
| Volume (cu ft.): | 0.15 |
| Cubic Foot Volume (Inch.): | 1728 |

The size of said soil module is not limited to a specific size. For example, a soil module could comprise the following sizes: 6 in by 6 in by 2 in. The soil module could also comprise much larger sizes in terms of area and depth. In addition, the soil module can comprise other shapes such as cylindrical shapes, triangles, or any other shape. The construction of the modules will be discussed in more detail in this specification.

Figure 1B:
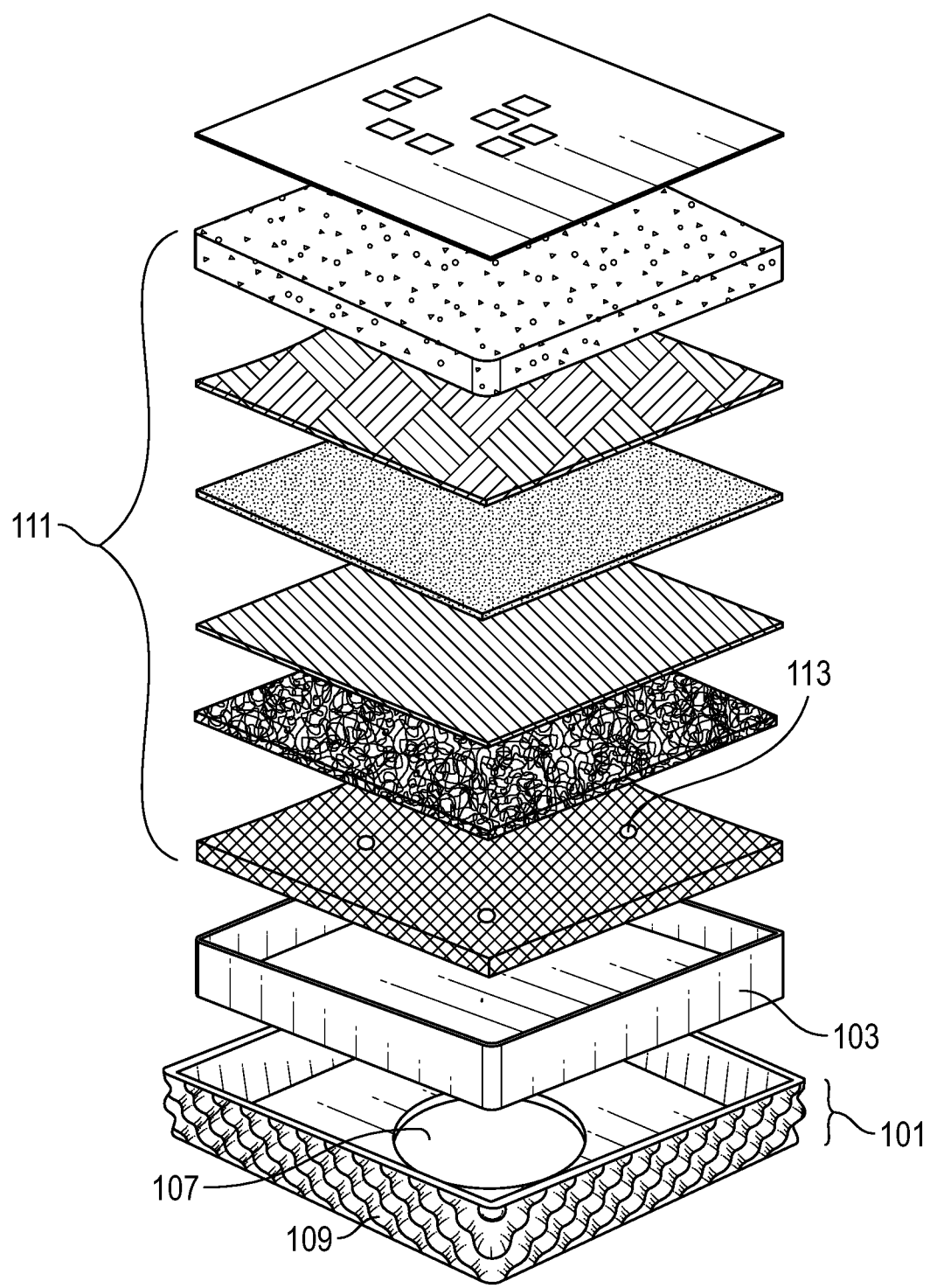

FIG. 1B shows a cross-sectional view of the soil module and its components. The layers shown in FIG. 1B are non-limiting and for illustrative purposes. The soil module comprises a rigid outer frame as shown as the bottom layer in FIG. 1B. This outer frame 101 may be rigid and self-supporting, meaning it is constructed to contain the weight of the internal components of the soil composition. In an embodiment, the outer frame 101 of the soil delivery module comprises a biodegradable substance. In an embodiment, this biodegradable substance comprises mycelium. When constructed with an opening 107 on the bottom of the outer frame 101, the outer frame 101 allows the plant roots within the soil module to grow through the material. Additionally, the soil module becomes more convenient for use, since no maintenance will be required to remove a biodegradable substance from a garden at a later stage. It is possible to construct the outer frame 101 from a non-biodegradable substance. The outer frame 101 can be constructed from mycelium, or other biodegradable substances such as coco-coir, bagasse, paper pulp and thermoplastic starch. The walls of the outer frame can comprise a sinusoidal texture 109.

The second layer from the bottom in FIG. 1B shows a thin biodegradable wrapping 103, which may be biodegradable paper (for example, a thin biodegradable sheet), designed to form the inner layer of the soil module and contain the soil composition deposited within the soil module. The inner layer 103 could comprise, for example, cellulose paper. The next six layers 111 shown in FIG. 1B are illustrative representations of the components of the soil composition contained within the soil module. These layers represent nutrients and minerals, cultured bacteria, a combination of soil amendments, capsaicin extract and seeds of at least one variety of plant 113. In an embodiment, each soil module contains one type of plant seed. The soil composition contained therein can be of a generic type suitable for most plant seeds to optimize growth. In an embodiment, the soil composition contained within said soil module has been particularly configured to optimize the plant growth of the specific type of plant seed contained within the soil module. In an embodiment, the soil composition is optimized to counteract any deficiencies in the soil composition of a local area wherein a garden area is selected and when the soil module is to be planted directly in the local soil.

Figure 2A:
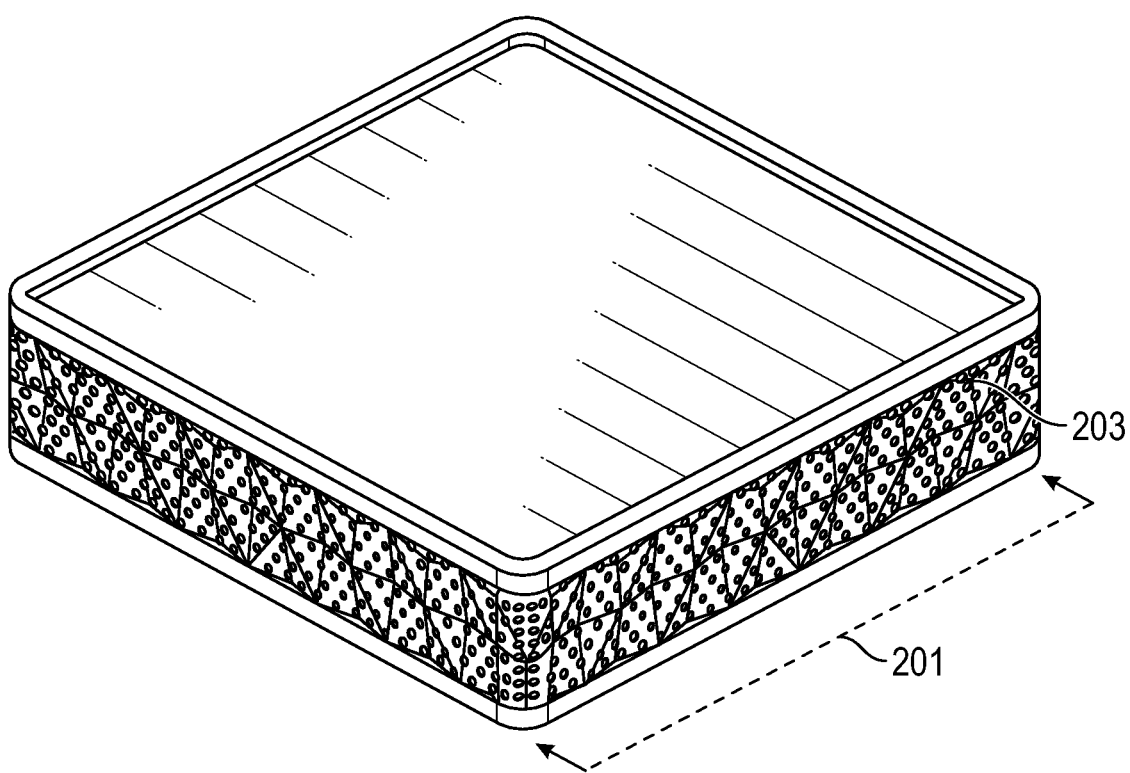
FIG. 2A-2J shows a perspective view of a self-contained soil module with textured and perforated side walls.
Figure 2B:
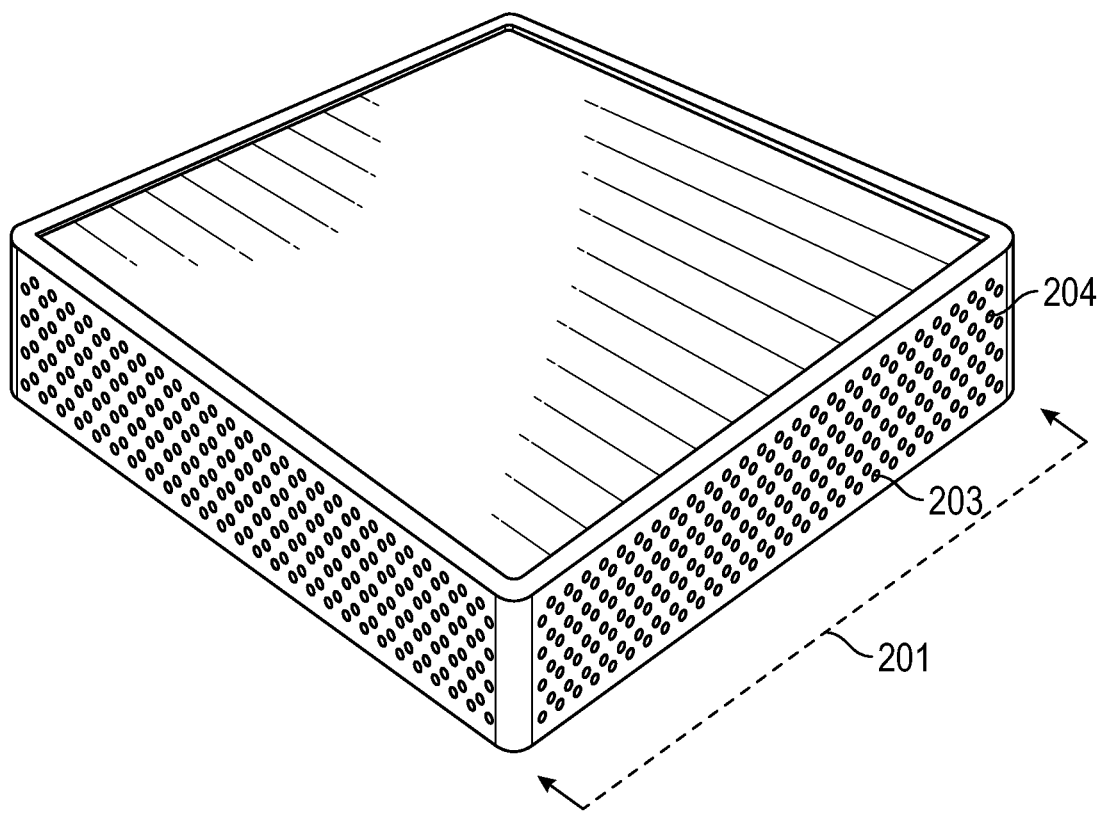
Figure 2C:
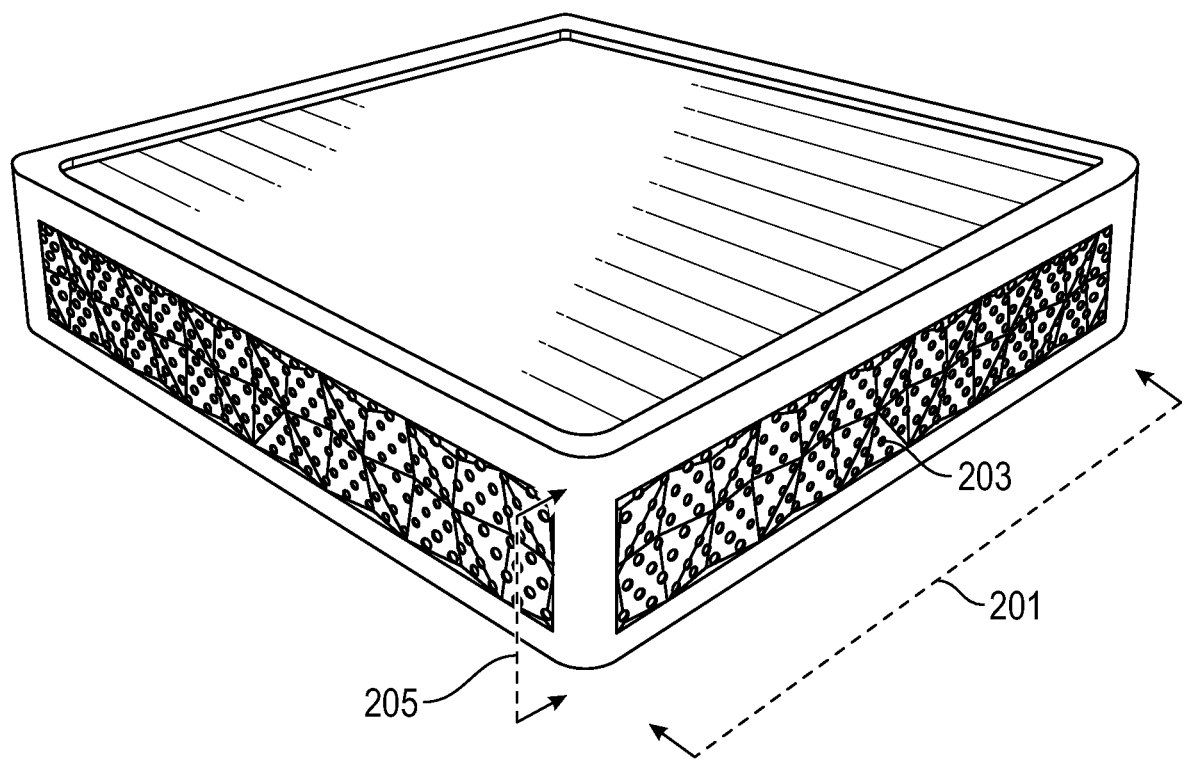
Figure 2D:
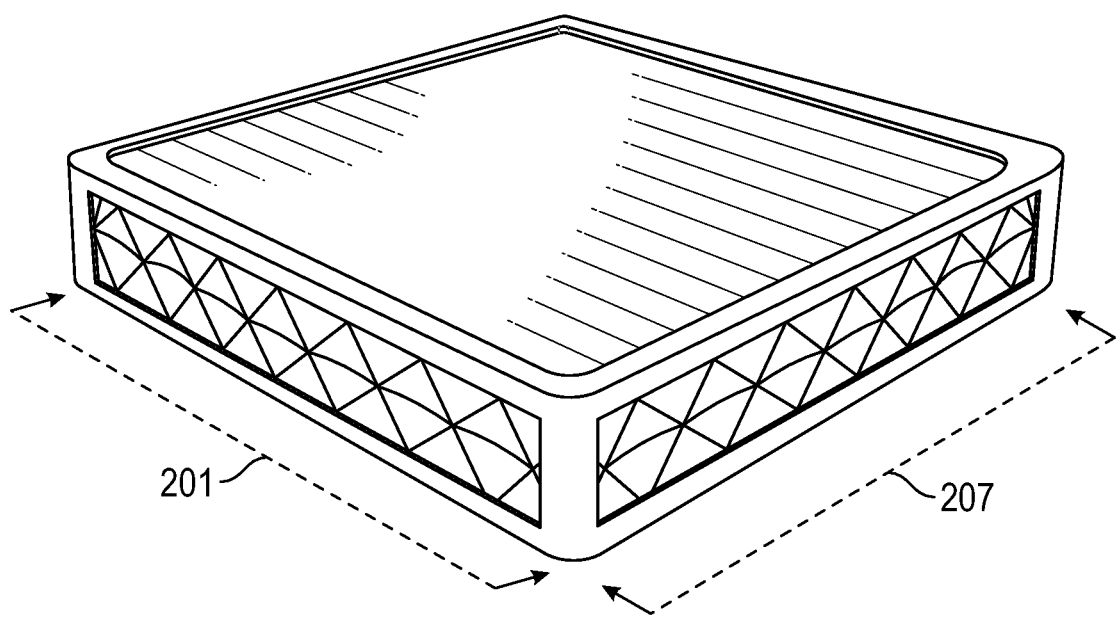
Figure 2E:
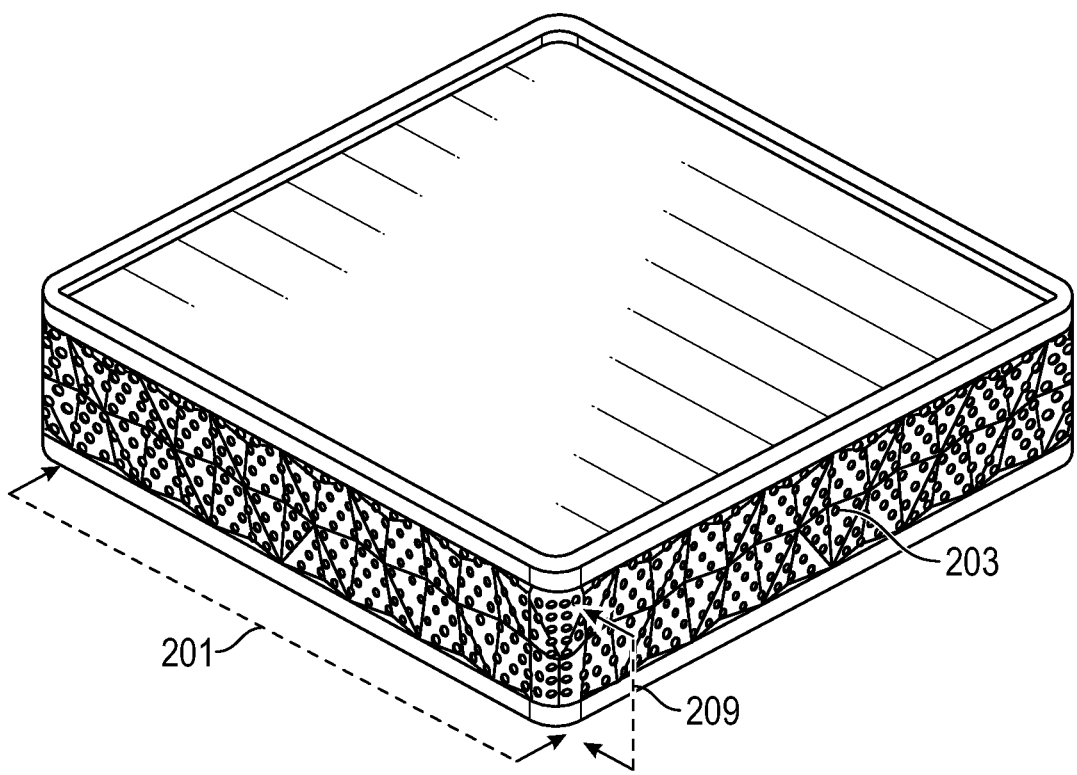
Figure 2F:
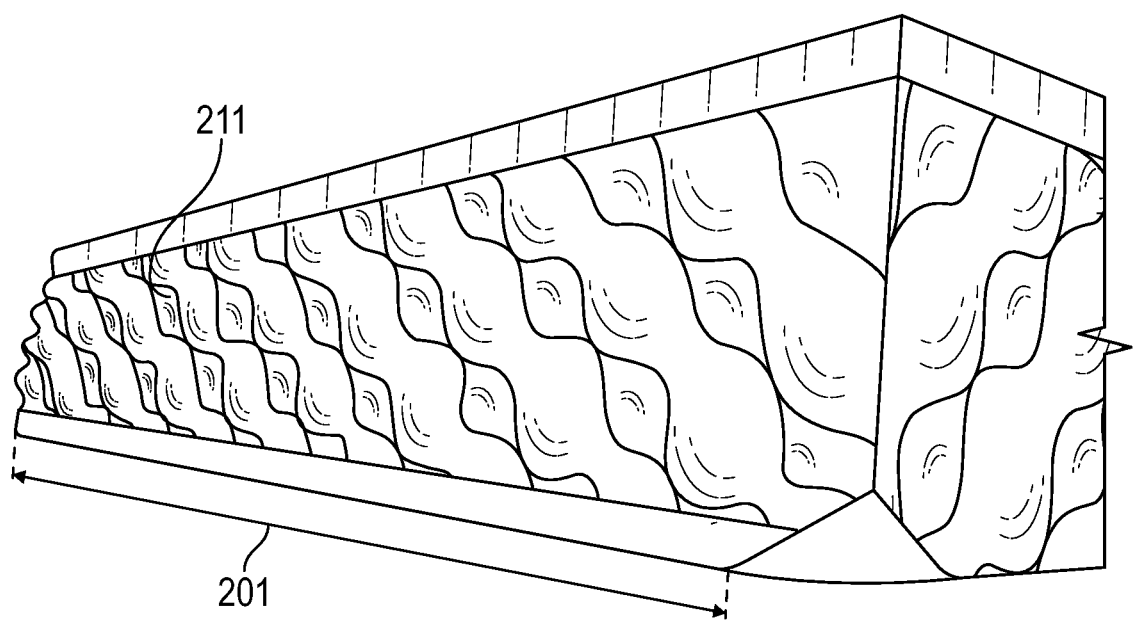
Figure 2G:
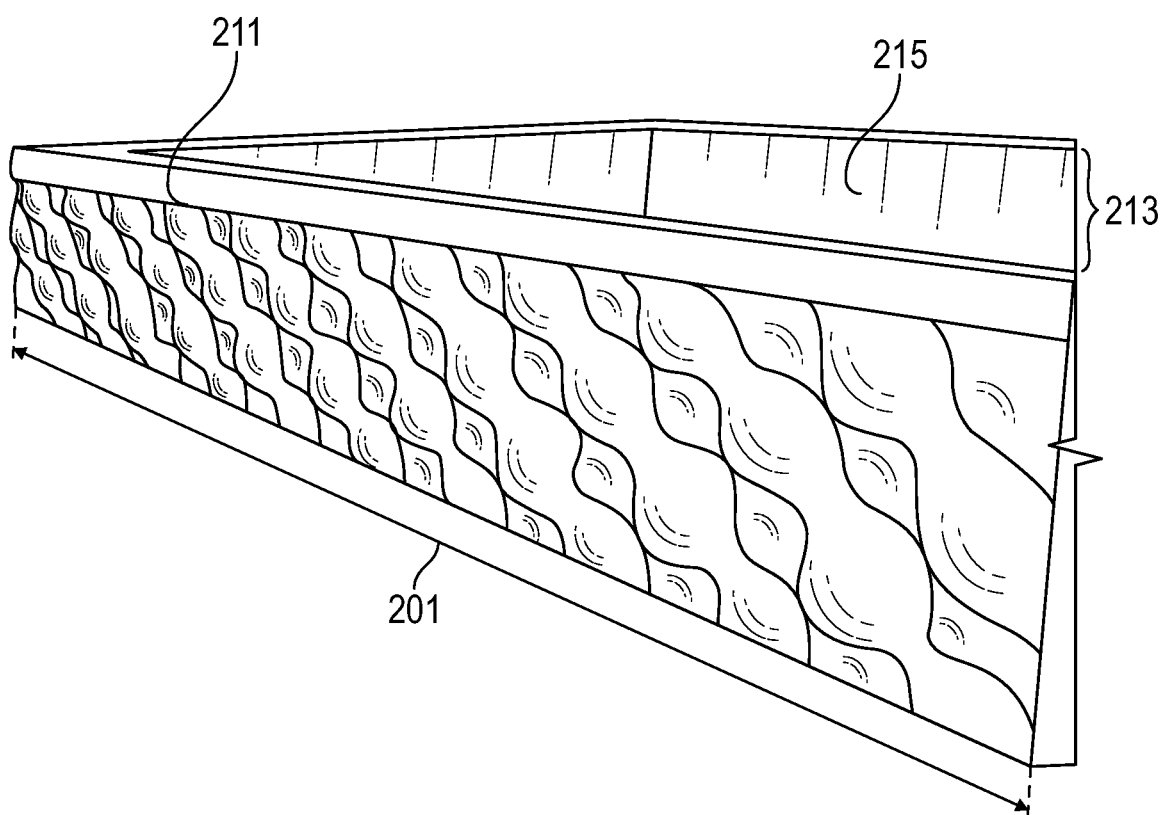
Figure 2H:
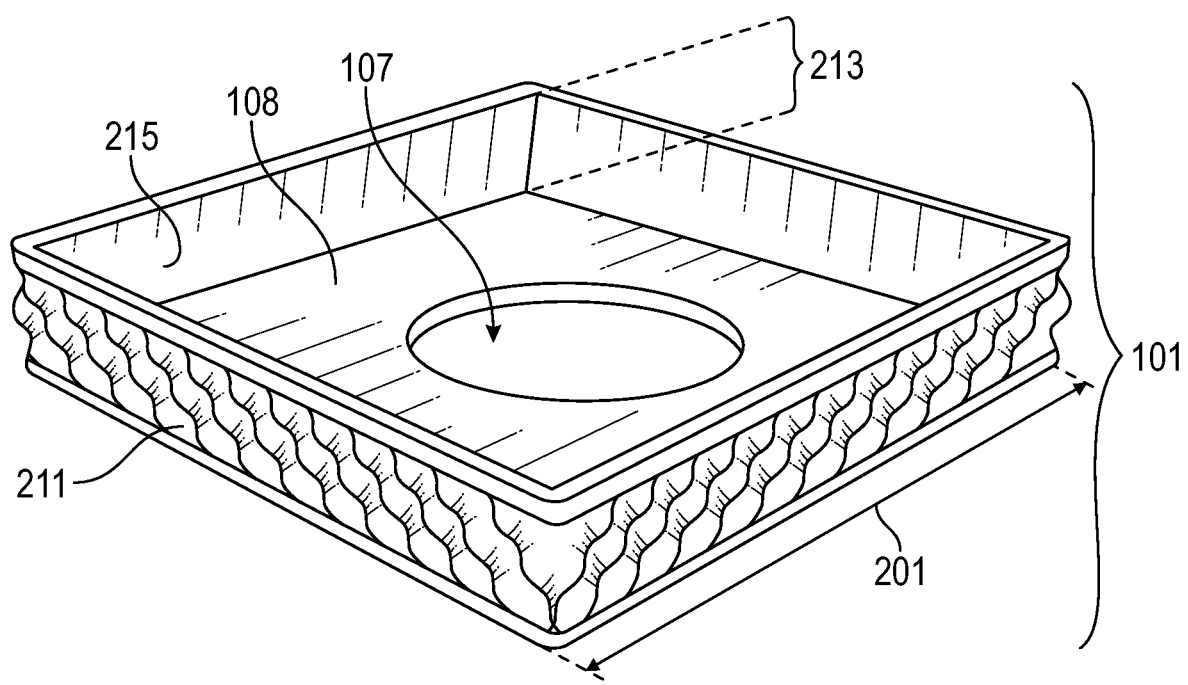
Figure 2I:
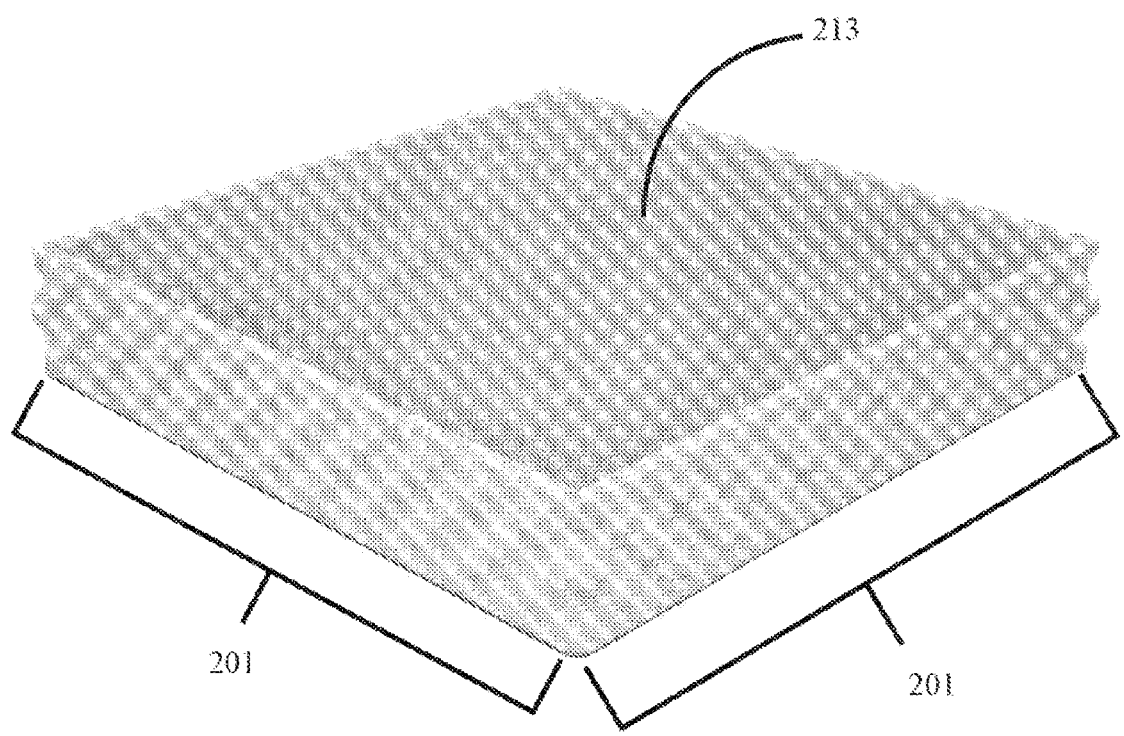
Figure 2J:
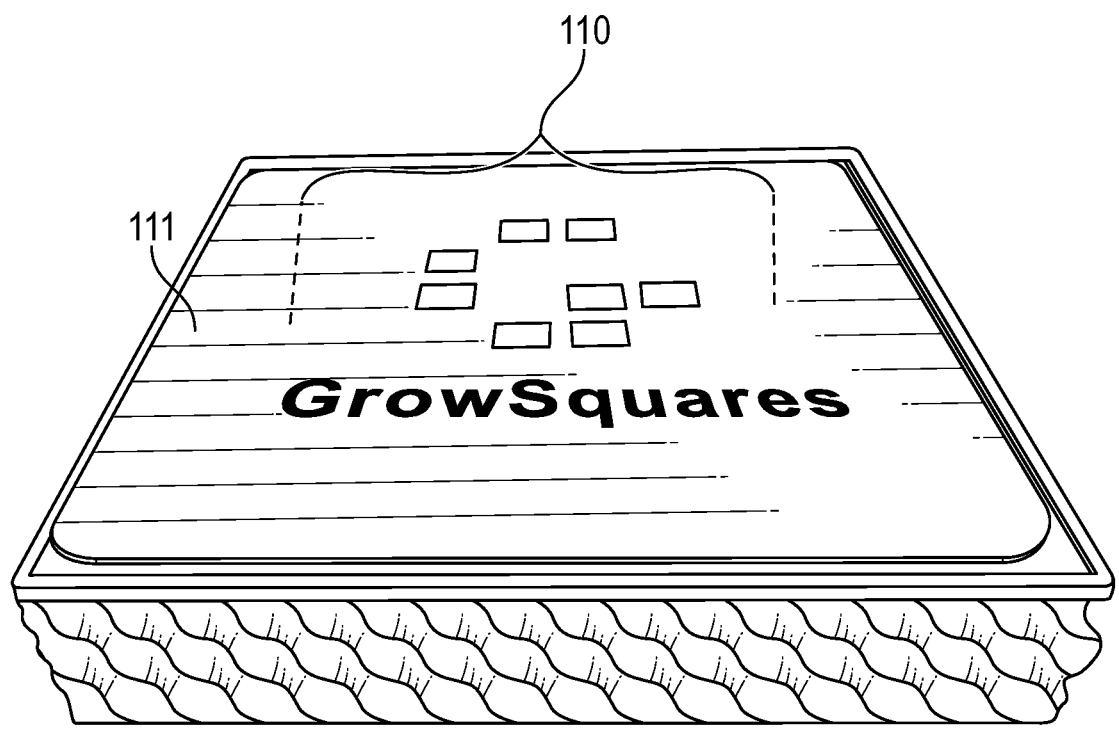

FIGS. 2A-2G show perspective views of a self-contained soil module comprising various textured side walls 201 and perforated side walls 203. FIG. 2A shows a perspective view of a self-contained soil module with textured side walls 201 and perforated side walls 203. As shown in FIGS. 2A-2G, the soil module is self-contained and sealed, and comprises textured side walls 201, as well as perforated side walls 203 to aid with water absorption and air flow. FIG. 2B shows a perspective view of a self-contained soil module with perforated side walls 203. This embodiment comprises non-textured side walls 204. FIG. 2C shows a perspective view of a selfcontained soil module with textured side walls 201 and perforated side walls 203. In addition, this embodiment contains non-perforated corners 205. FIG. 2D shows a perspective view of a selfcontained soil module with textured side walls 201. However, this embodiment comprises nonperforated side walls 207. FIG. 2E shows a perspective view of a self-contained soil module with perforated side walls 203. This embodiment contains textured side walls 201 and perforated corners 209, such that the perforations extend around all four sides of the soil module. FIG. 2F shows a perspective view of a self-contained soil module with textured side walls 201. In an embodiment, the outer frame has a sinusoidal wall texture 211. FIG. 2G shows a perspective view of a self-contained soil module with textured side walls 201. In an embodiment, the outer frame has a sinusoidal wall texture 211 and the inner walls 213 have a grooved wall texture 215. FIG. 2H shows a perspective view of a self-contained soil module with textured side walls 201 and an opening 107 in the bottom 108 of the outer frame 101. The size and shape of the opening 207 shown in FIG. 2H are non-limiting and for illustrative purposes. This embodiment comprises an outer frame 101 with a sinusoidal wall texture 211 and inner walls 213 with a grooved wall texture 215. FIG. 2I shows a perspective view of a self-contained soil module with textured side walls 201. In an embodiment, the soil module comprises a cuboid shape having a top and bottom and four symmetric side walls. Two of the symmetric, textured side walls 201 are illustrated here. The size of said soil module is not limited to a specific size. The modular nature of the selfcontained soil module allows for multiple soil modules to be placed next to each other in a garden. The garden can comprise nearly any size or shape and be conveniently planted using said soil modules. In an embodiment all sides of the soil module are composed of biodegradable material including the top layer shown in FIG. 2I. When the components of the soil module are selected to be biodegradable, the end user must merely place the soil module at the desired location for their garden and water accordingly. FIG. 2J shows a perspective view of a self-contained soil module including a label 110 featured on biodegradable paper 111. The label 110 shown in FIG. 23 is non-limiting and for illustrative purposes.

Figure 3B:
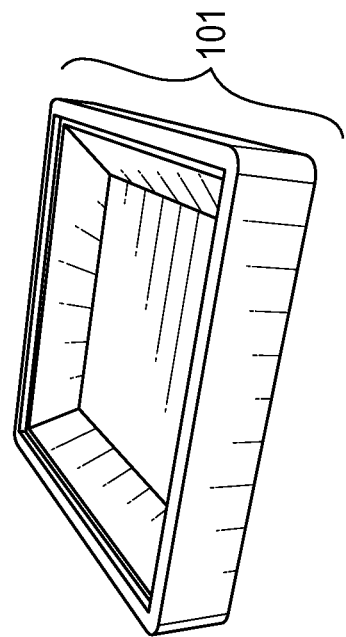
FIGS. 3A-3D show a top perspective, front and interior views of an outer frame of a soil module with the lid removed.
Figure 3A:
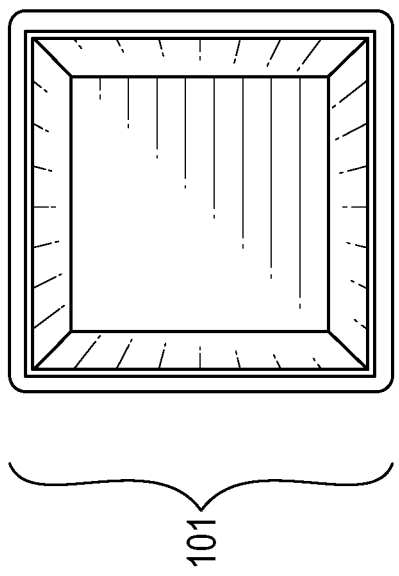
Figure 3D:
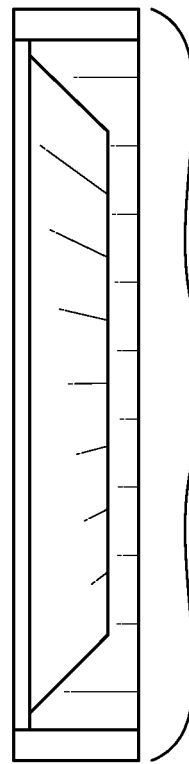
Figure 3C:
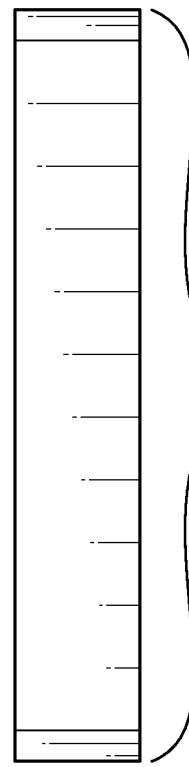

FIG. 3A shows a top view of the outer frame 101 of a soil module. FIG. 3B shows a perspective view of the outer fame 101 of a soil module. FIG. 3C shows a front view of the outer frame 101 of a soil module. FIG. 3D shows an interior view of the outer frame 101 of a soil module. When the outer frame 101 of the soil module comprises mycelium, it is possible to grow the mycelium in a substrate, wherein the substrate provided can be of the shape as shown in FIGS. 3A-3D. Alternatively, the mycelium outer frame 101 can be crafted and combined from pieces of individual mycelium layers grown separately and then bonded with an adhesive. Alternatively, the outer frame 101 shown in FIGS. 3A-3D can be constructed from alternative materials that are either biodegradable or non-biodegradable.

Figure 4:
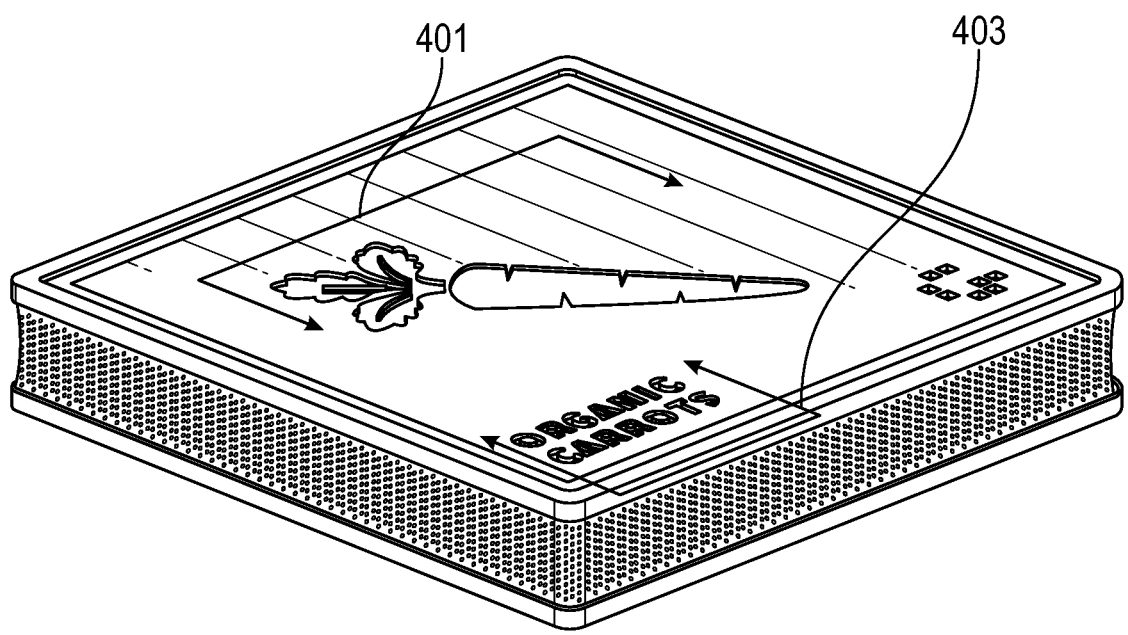
FIG. 4 shows a perspective view of a self-contained soil module comprising an image and label on the top of the soil module.

FIG. 4 shows a perspective view of a self-contained soil module comprising an image 401 and label 403 on the top of the soil module. In an embodiment, a self-contained soil module will have an indicator placed on the top of the soil module so that an end user can easily identify the plant seeds contained within the soil module. In an embodiment, the soil module contains one type of plant seed. In the example of FIG. 4, the soil module comprises carrot plant seeds and an image 401 of a carrot is placed on the top of the soil module to identify the seed contents of the soil module. A company logo can also be placed on the soil module.

Figure 5:
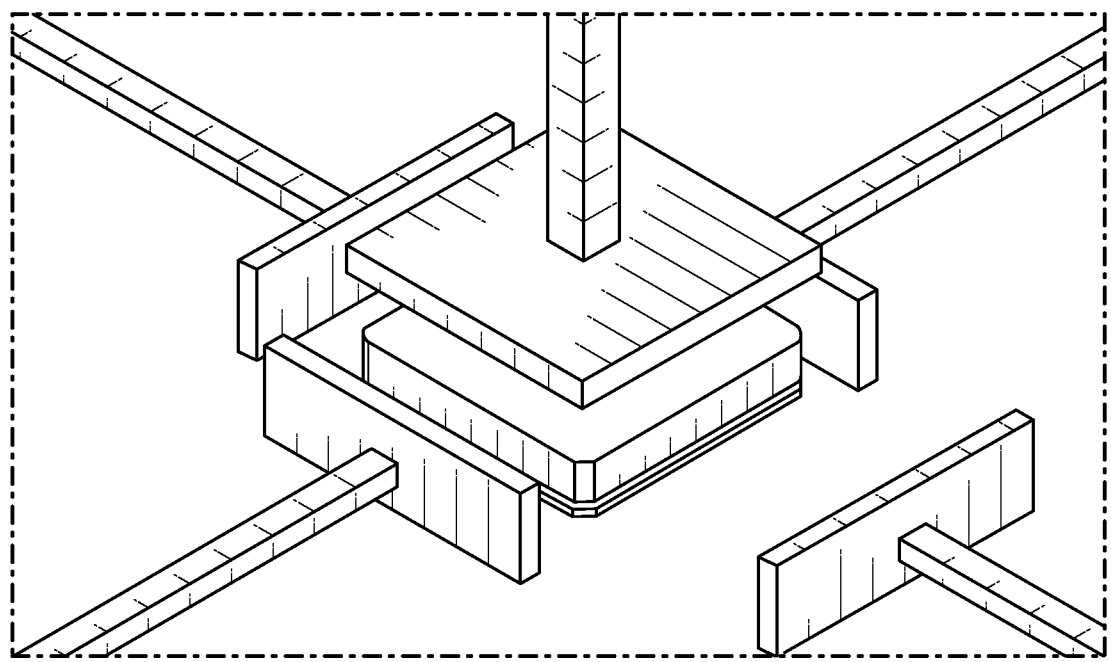
FIG. 5 shows a perspective illustrative view of the manufacturing of a soil module.

FIG. 5 shows a perspective illustrative view of the manufacturing of a soil module. As previously discussed, the outer frame 101 of the soil module can comprise either biodegradable or non-biodegradable material and forms a rigid self-supporting outer layer. In an embodiment, the outer frame 101 of the soil module comprises mycelium.

In a non-limiting example, mycelium could be prepared in the following manner for construction of an outer layer of a soil module. In the below example, individual sheets of mycelium are grown and then these sheets are cut into shapes to form the top, bottom, and side walls of a cuboid soil module.

Mycelium Preparation:

First, pasteurize a substrate. Substrates can be constructed from materials such as straw, hardwood sawdust, manure, coco coir and vermiculite, coffee grounds and more. Substrates may be produced from agricultural waste. Next, inoculate the substrate with a mycelium spawn. The exact strain of mycelium is selected for optimizing the desired characteristics of the final mycelium outer frame. Then, mix flour and water with the inoculated substrate. The precise quantities of flour and water can be altered to optimize the performance and structure of the eventually created mycelium outer frame. Take the mix and let it grow in a sealed plastic bag or container for a number of days, for example, 5 days. After the predetermined amount of time (days), remove the mix from the bag and break down the mix into fine aggregate. Add additional flour and water to the fine aggregate. Add enzymes and catalysts to the aggregate. The enzymes and catalysts are chosen to control the growth of the mycelium. Thoroughly mix all the above ingredients.

Form and Mold Prep:

Sterilize sheet forms with hydrogen peroxide. Evenly spread mycelium mix over bottom sheet form. Lightly pack mix into form, wiping excess mix back into sterile container. Cover with top sheet form. Place full sheet form in tray stack in environmentally controlled grow tent. Allow forms to grow in tent for 7-10 days, maintaining humidity of roughly 90%. Once mycelium growth has bound all particles and filled the extents of forms, remove from tray stack while maintaining sterile environment. Separate molded pieces into 4 wall components, base grid (bottom), and top grid (top). Join 4 wall components and base grid with a biobased mastic, although nonbiodegradable adhesives may also be used. Place the now 5-sided outer frame of container and top grid back in tray stack in grow tent. Allow components to grow for an additional period of approximately 2 days to develop outer membrane, again maintaining approximately 90% humidity in grow tent. Once fully grown, cross ventilate grow tent with warm dry air until forms are rigid. Some variations of components require heat or a baking process to cure and stop the growth, but this may cause discoloration. In an embodiment of the invention herein the components are designed to be relatively thin, which allows the components to be easily air dried and to cease to grow. In alternative embodiments, heat or enzymes can be used as opposed to air drying. Remove completed components from grow tent.

Assembly: Cut a biodegradable cellulose paper to form a top and a bottom sheet of the soil packet. Place the bottom sheet of cellulose paper into a square tray container. Fill container with engineered soil mix. As discussed below, this soil mix is specifically designed to optimize the plant growth of the seeds contained therein and, if necessary, to counteract any deficiencies in the local soil if the module is to be placed in a local soil. Apply mastic (such as a biobased mastic) to the edges of the bottom sheet. Cover with the top sheet and adhere edges, forming a wrapping, which envelops the complete packet comprising the cellulose paper and engineered soil mix. Lightly press the complete packet into tray container for more rectangular/cuboid shape. Remove the complete packet from the tray container and place soil packet into the mycelium outer frame. Adhere mycelium top grid with mastic (for example, biobased). At a point in the above steps, seeds can be injected into either the mycelium outer frame or the engineered soil. A self-contained soil module is now ready for delivery to a garden. The above identified steps are capable of being automated. An autonomous or semiautonomous system may be constructed to carry out the above steps. For example, a machine may autonomously or semi-autonomously grow mycelium sheets, provide the mycelium sheets to another machine responsible for cutting the mycelium sheets and forming the sheets into soil modules. Further, another machine may be tasked with preparing a soil composition based on specified requirements fed to the machine beforehand. The soil compositions could be fed automatically into biodegradable sealed paper packets that are then pressed in placed into the soil modules, which are then sealed with the top layer of the soil module and are now ready for delivery. The plant seeds may be implanted at any step automatically, for example, by placing the plant seeds in the mycelium sheets or in the soil composition.

Figure 6:
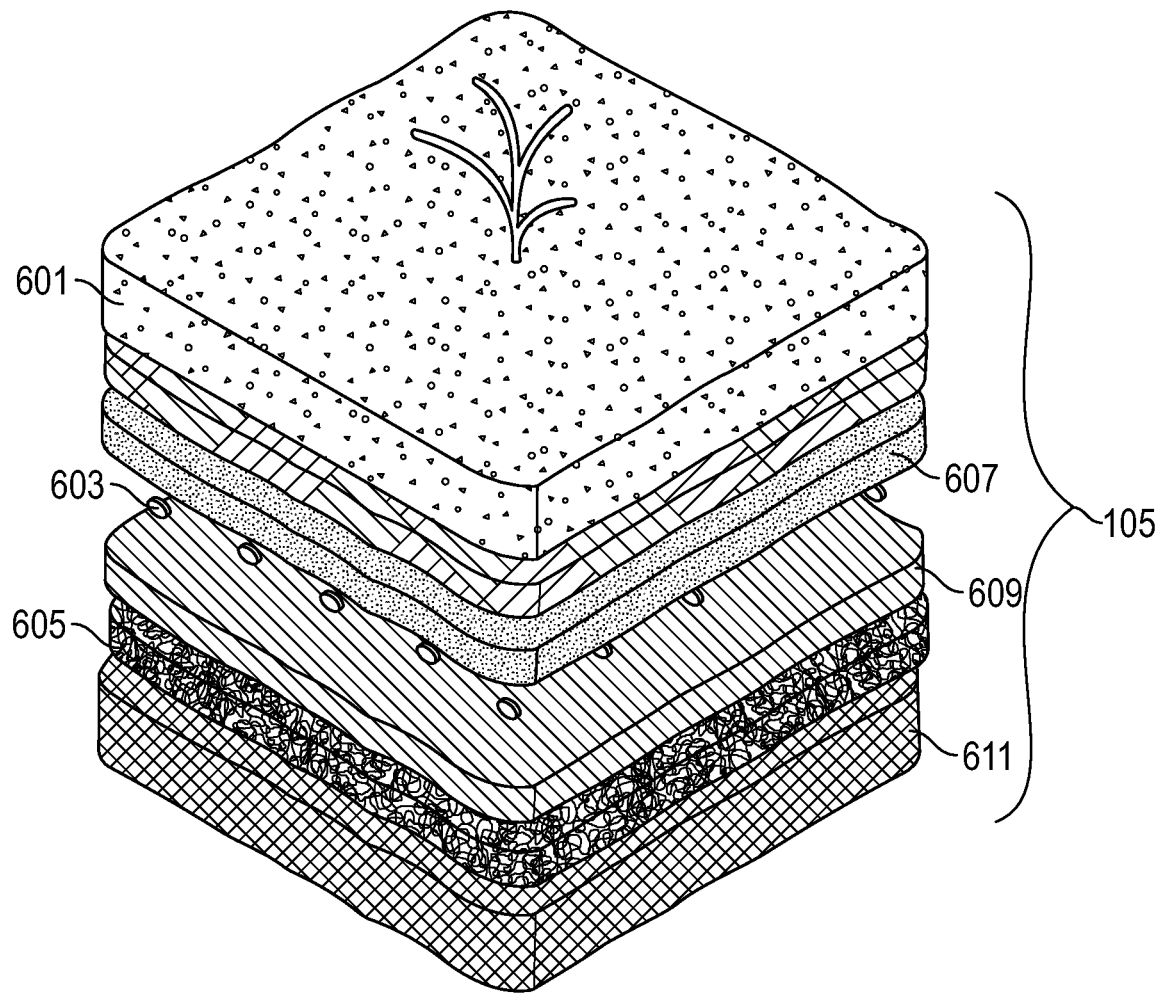
FIG. 6 shows a perspective cross-sectional view of illustrative internal compositions contained within a soil module.

FIG. 6 shows a perspective cross-sectional view of illustrative internal compositions contained within a soil module. As mentioned above, the soil composition 105 placed inside a soil module is engineered to optimize the growth a plant seed or seeds contained therein. This soil composition 105 as shown in FIG. 6 comprises engineered soil 601, seeds 603, minerals 605, bacteria 607, nutrients 609, and fertilizers 611.

Figure 7:
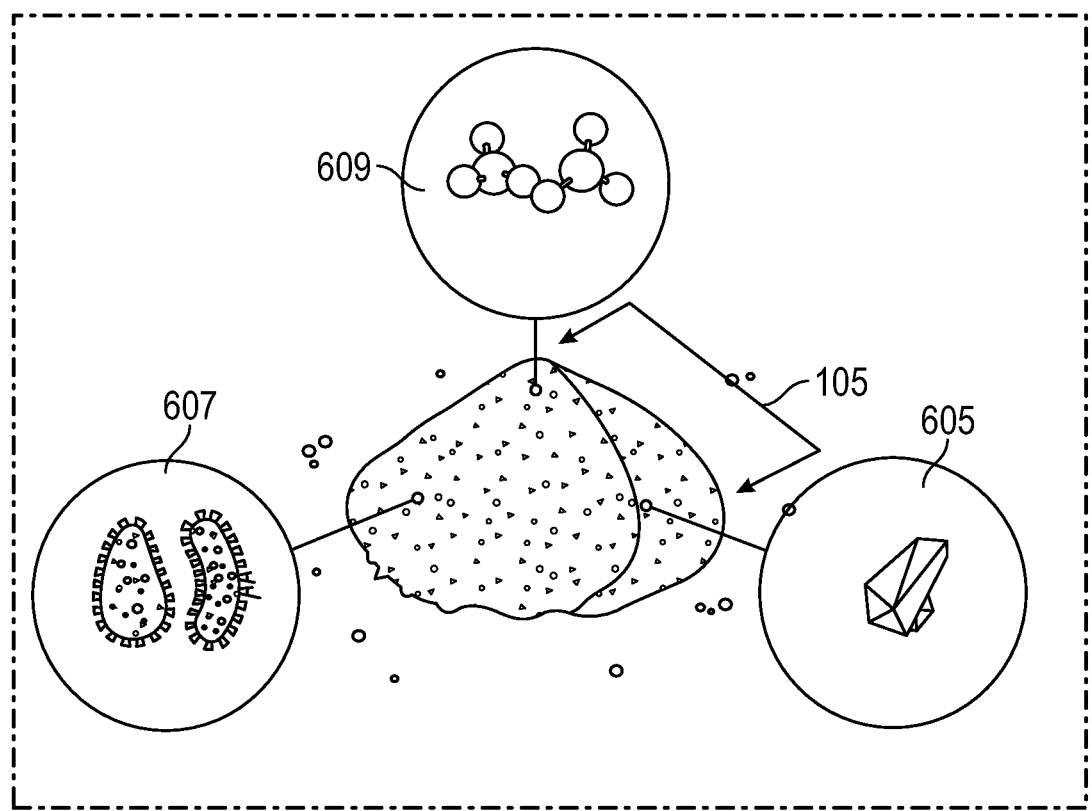
FIG. 7 shows a perspective view of a soil composition showing examples of the components contained within the soil composition.

FIG. 7 shows a perspective view of a soil composition showing examples of the compositions contained within the soil composition 105, such as, nutrients 609, bacteria 607, and minerals 605.

Figure 8:
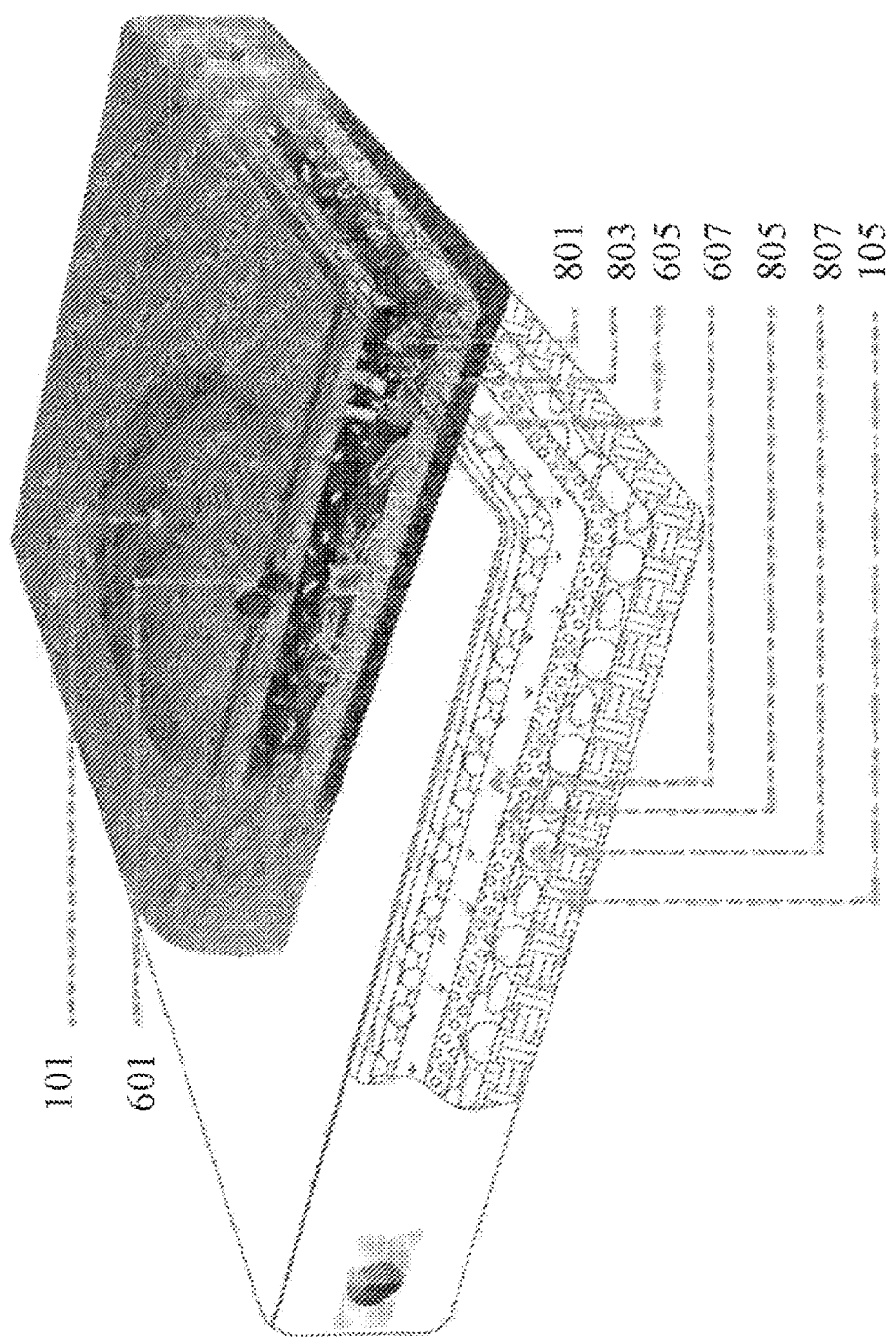
FIG. 8 shows a perspective cross-sectional view of a soil module and the components contained therein.

FIG. 8 shows a perspective cross-sectional view of a soil module and the components contained therein. As shown in FIG. 8, the outer frame 101 of the soil module is biodegradable. As discussed above, this outer layer can comprise a rigid mycelium outer frame 101. The mycelium can have seeds 601 injected into it. At least one seed from at least one type of plant is injected into the soil module. The outer layer may be rigid and maintain the shape of the soil module. The contents of the soil module may comprise, as shown in FIG. 8, engineered soil 105, moisture control agents 807, time release fertilizers 805, beneficial bacteria 607, minerals 605, nematodes 803, and cayenne 801.

Further, the engineered soil mixture may comprise 1 to 14 or more different components including bio-stimulants, pH balancers, fertilizers, and moisture control agents. The weighting of the components of the soil composition contained within the soil module can be selected based on (1) the local soil analysis of a location of a potential soil the soil module is to be placed in; and/or (2) the type of plant seeds chosen to be injected in said soil module. For example, the soil composition of a generic soil module of an embodiment of the invention disclosed herein may comprise the ingredients and weighted percentages of said ingredients as shown below with a Compression multiple of 1.08:

| Default Block Composition | | |
|---|---|---|
| Peat Moss | 23.0% | Growing Medium |
| Pearlite | 24.0% | Moisture Control |
| Coco Coir | 20.0% | Growing Medium |
| Compost | 14.0% | Organic Matter |
| Manganese Greensand | 3.3% | Micronutrients |
| Bloodmeal | 1.2% | Nitrogen |
| Rock Phosphate | 1.3% | Phosphorus |
| Lime | 2.0% | pH Balance |
| Worm Castings | 0.8% | Fertilizer |
| Potassium Sulfate | 0.8% | Fertilizer |
| Azomite | 0.8% | Fertilizer |
| Alfalfa Meal | 0.8% | Fertilizer |
| Bonemeal | 1.4% | Phosphorus |
| Biochar | 0.5% | Carbon |
| Capsaicin | 0.0% | Insecticde |
| Chicken Manure | 0.8% | Fertilizer |
| Cotton Seed | 0.9% | Fertilizer |
| Feather Meal | 2.2% | Nitrogen |
| Kelp Meal | 0.6% | Micronutrients |
| Langbeinite | 0.2% | Sulfur |
| Rock Dust | 0.3% | Remineralization |
| Tapoica | 0.4% | Seed Encasement |
| Total | 100% | |

When a plant is deprived of certain types of nutrients its growth and health suffer. Likewise, when certain fertilizers are added to a soil composition, a plant's growth and health is enhanced. The above described generic soil composition for an embodiment of the invention disclosed herein is designed to produce an optimal balance of nutrients, minerals, fertilizers, etc. for optimal plant growth and health for most circumstances. In addition, the soil composition may comprise cultured bacteria to further enhance the soil compositions bent-fit to a growing plant.

The generic soil composition described herein can be customized and the weightings of individual components altered to optimize plant growth and health for the specific type of plant seeds contained within a soil module. For example, some plants grow better and be healthier when, for example, more of one soil component is present relative to others. Alternatively, reducing a soil component relative to others may provide an enhanced environment for a particular plant to grow. A customized soil composition with a variety of soil components being increased or decreased can provide an optimal soil composition for a particular plant to grow in. For example, in the case that a soil module is configured to grow tomatoes, the following customized soil composition can be created:

| Tomato Block Composition | | |
|---|---|---|
| Item (Internal Contents): | % Composition: | Contribution: |
| Peat Moss | 22.0% | Growing Medium |
| Peat Moss | 22.0% | Growing Medium |
| Pearlite | 77.5% | Moisture Control |
| Coco Coir | 17.0% | Growing Medium |
| Compost | 12.0% | Organic Matter |
| Manganese Greensant | 3.3% | Micronutrients |
| Bloodmeal | 1.1% | Nitrogen |
| Rock Phosphate | 1.3% | Phosphorus |
| Lime | 3.8% | pH Balance |
| Worm Castings | 0.9% | Fertilizer |
| Potassium Sulfate | 0.9% | Fertilizer |
| Azomite | 0.9% | Fertilizer |
| Alfalfa Meal | 0.9% | Fertilizer |
| Bonemeal | 1.3% | Phosphorus |
| Biochar | 1.3% | Carbon |
| Capsaicin | 0.0% | insecticide |
| Cotton Seed | 1.3% | Fertilizer |
| Feather Meal | 1.5% | Nitrogen |
| Kelp Meal | 1.3% | Micronutrients |
| Langbeinite | 0.8% | Sulfur |
| Rock Dust | 0.5% | Remineralization |
| Tapoica | 0.4% | Seed Encasement |
| Vermiculite | 0.3% | Magnesium |
| Molybendum | 0.0% | Catalyst |
| Zinc | 0.1% | |
| Chicken Manure | 0.0% | Fertilizer |
| | 100% | |

The second column of cells shows percentage changes to the soil composition as compared to a generic default soil composition. For example, the peat moss percentage cell indicates a decrease in peat moss in the tomato soil composition to 22% as compared to a default soil composition with peat moss at 23%. Further, the pearlite percentage cell indicates an increase in pearlite in the tomato soil composition to 27.5% as compared to default soil composition with pearlite at 24%. The other percentage weightings of components are increased or decreased to provide an enhanced and more optimal soil composition for growing tomatoes.

The above-identified composition is an illustrative embodiment for a single type of plant, tomato. Other plant types require different soil compositions to provide the best conditions for optimal growth and health. The benefit and advantage of the invention described herein is that the soil composition for each soil module can be customized to optimize the growth and health of the type of plant seed contained therein. Therefore, a single soil module containing tomato seeds could comprise an optimal soil composition as described above for tomato plants. At the same time, a separate soil module for growing a different variety of plant could contain a different soil composition optimized for that specific variety of plant. These two unique soil modules could be placed side by side in a garden allowing for two different types of plants to grow in their respective optimal soil compositions.

Figure 9:
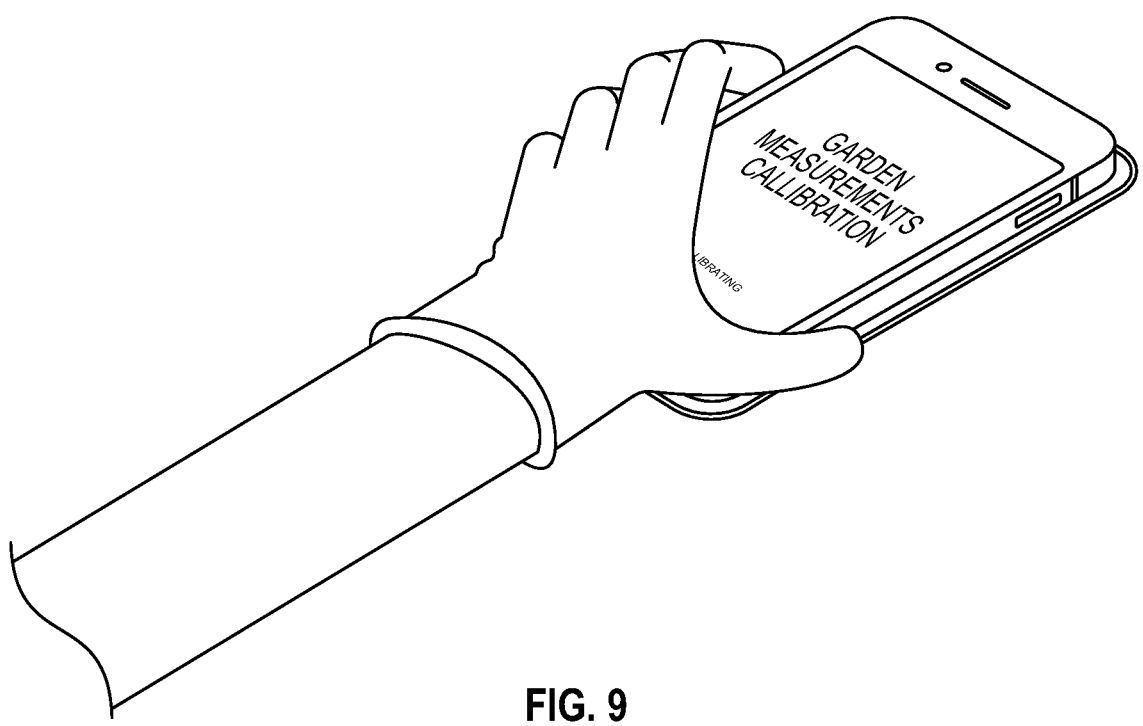
FIG. 9 shows an illustrative embodiment of a user placing a sensor at the location of an intended garden area.
Figure 13:
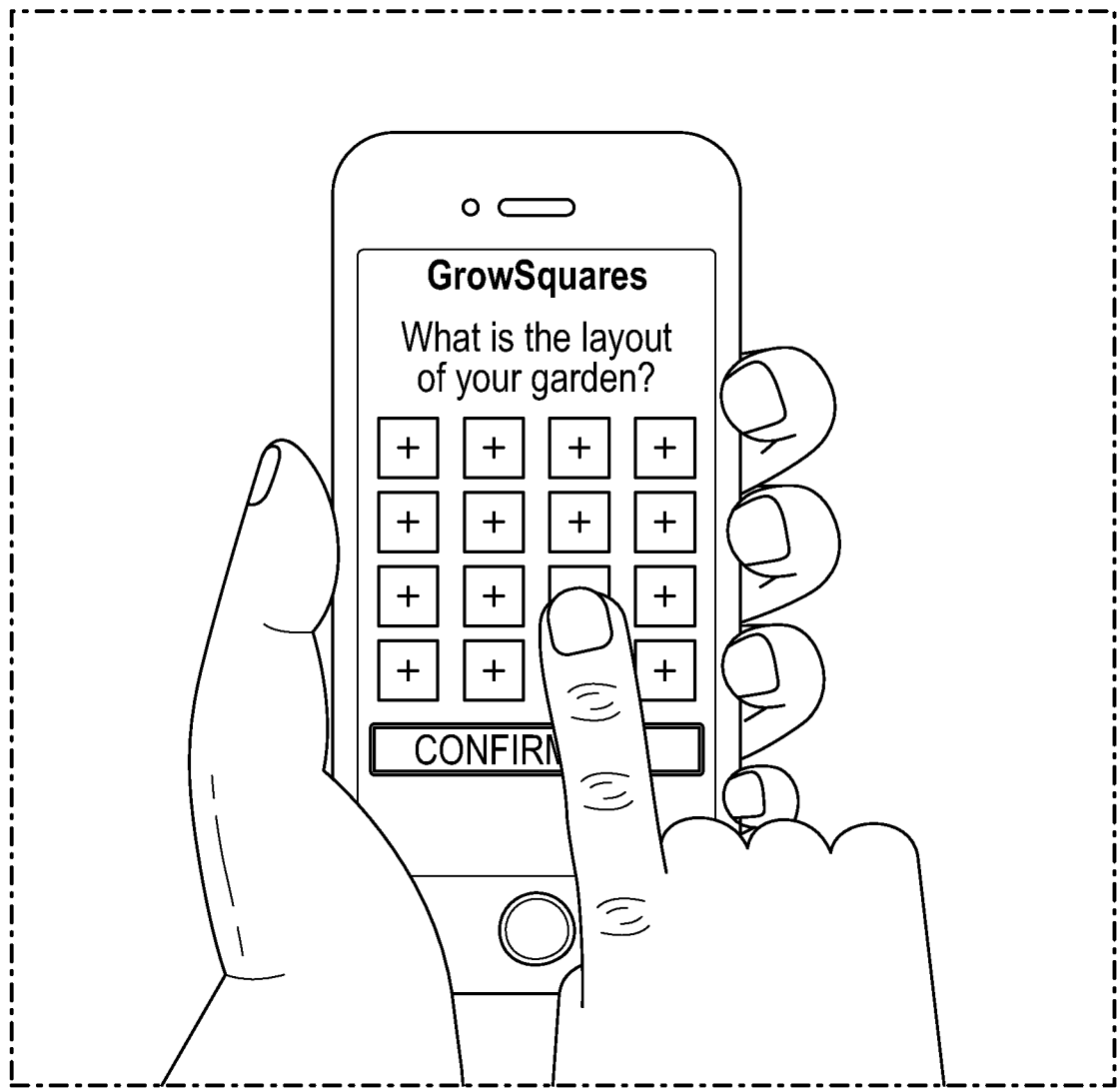
FIG. 13 shows an illustrative embodiment of a user interacting with a smartphone-based application for calculating the size and composition of a potential garden.

FIG. 9 shows an illustrative embodiment of a user placing a sensor at the location of an intended garden area. The sensor placed at the intended garden location may comprise one or more sensors. In the embodiment of FIG. 13, the sensors are self-contained within a smartphone device. The smartphone device through the use of a camera contained within a smartphone is able to assess the ambient solar light being received at the location. In addition, the smart phone device is capable of calculating the geographic location of the intended garden (for example, via a OPS or other geographic location sensor), as well as its orientation (for example, via a gyroscope and/or an accelerometer).

Figure 10:
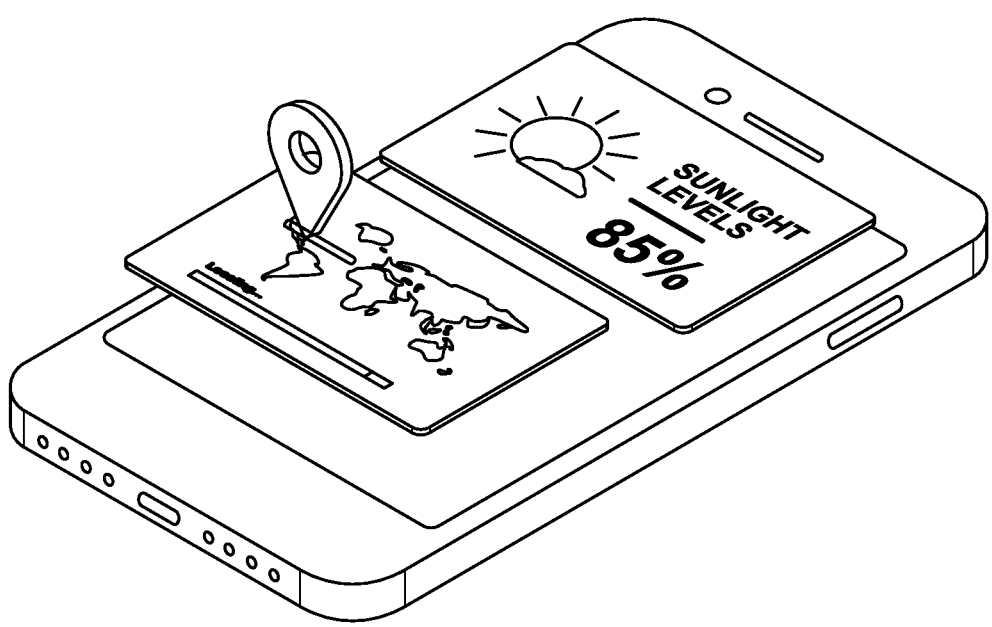
FIG. 10 shows an illustrative embodiment of the calculations computed based on the location of a planned garden area.

FIG. 10 shows an illustrative embodiment of the calculations computed based on the location of a planned garden area. The methods disclosed herein can take as inputs data gathered from sensors located at the specific gardening location, data gathered from general data gathering sources, or combinations thereof. The goal is to use the inputted data to compute: (1) Sunlight levels; (2) Soil Analysis; (3) Forward-Looking Weather; (4) Historical Weather; and (5) Agronomic API in order to make determinations regarding what plant life is optimal for a userselected garden as well as additional decisions such as watering and harvesting alerts. In general, the methods of analyzing these data inputs are considered a form of microclimate analysis. For each individual garden data can be provided with enough detail to provide a microclimate analysis encompassing for example the wind, light, and rain conditions at the garden location. This analysis can comprise analyzing historical data, current data as well as predicative data, such as rain fall predictions. An analysis of a microclimate may result in using different soil compositions depending on the microclimate. For example, locations wherein it is determined that the microclimate will experience heavier rain or more intense sunlight may require changes in the soil composition components to improve a plant seeds growing environment. The determination to change soil compositions based on microclimate analysis can be done independent of or in conjunction with determination to change a soil composition based on a local soil analysis or customization of a soil compositions based on improving the growing conditions for a particular plant seed.

Some of the data providers may include: MapDwell (mapdwell.com/en/solar/); OpenWeatherMap (openweathermap.org); SoilGrids (soilgrids.org); Dark Sky (darksky.net); Weather Underground (wunderground.com); and aWhere (awhere.com).

Forward-looking weather is a crowd-sourced data provider such as, Dark Sky (darksky.net), which is a system that captures users' barometric pressure readings (their mobile app passively captures a reading every 90 seconds) to refine weather predictions on a mediumterm, for example, a 10-day basis. These predictions ensure that plants are not overwatered by users when rain is forecasted and adjusts recommended plant care based upon forecasted weather patterns.

Figure 16:
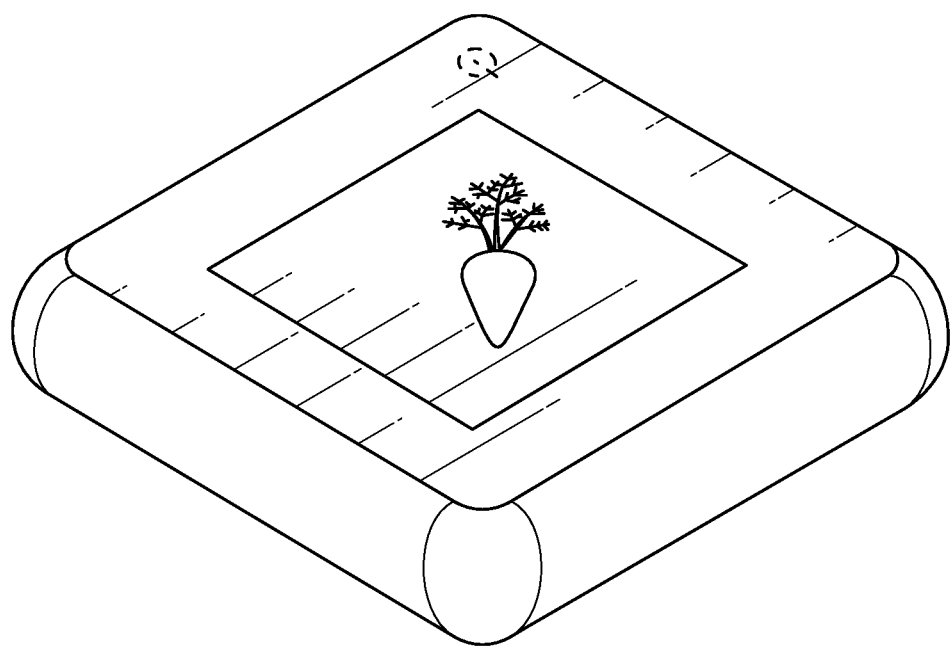
FIG. 16 shows a perspective view of a self-contained soil module with label prepared for delivery to an end user.

Barometric pressure readings can also be used to estimate the amount of solar light incident upon a garden. Solar assessment maps discussed below with respect to FIG. 16 show a top-level view of the solar light incident upon the upper surfaces of buildings or trees. For gardens that are below the height of those rooftops or trees, a barometric pressure reading at the garden site can estimate the difference in elevation and then a discount of the solar light hitting the top of the rooftop can be computed to capture loss of solar light due to shadows from buildings and other obstructions.

Historical weather data, such as that provided by Weather Underground (wunderground.com), may also be used.

Additionally, agronomic APs, such as aWhere (awhere.com), provide a large amount of data that can be integrated into a larger system, for example, for tracking changes in evapotranspiration, refining yield models, etc. Windy.com may also be used.

In another embodiment, nutritional information regarding food can be integrated into a user interface with information being provided by data sources such as a project spearheaded by NYU: Sage Project (sageproject.com).

Figure 11:
FIG. 11 shows an illustrative breakdown of soil compositions in geographic areas.

FIG. 11 shows an illustrative breakdown of soil compositions in geographic areas. Remote soil maps such as the type shown in FIG. 15 can provide data on a per block city basis. Alternatively, an end user of a soil module can sample the soil and transmit the results to a neural network that determines the soil composition. Local soil components can then be determined on a local level with a great deal of resolution. The soil delivery block or module will then be designed to have a soil composition that makes up for any deficiencies in the local soil. The soil composition will then be further refined to optimize the growth potential for the particular plant intended to be grown from the soil module. An example of a source of soil data is a publicly available API—SoilGrids (soilgrids.org), which provides the taxonomy of the underlying soil of every point on the globe with varying degrees of accuracy and resolution. The value of these classifications includes identifying nutrient deficiencies which allows for a soil composition contained within a soil module to be modified to cure any deficiencies, with use of nutrient additives in the manufacturing process.

The methods employed herein can add an additional layer of resolution to these maps with, for example, soil data captured by municipal governments. For example, all schools need to run a soil test every year to ensure lead levels fall below an 'acceptable standard' (in addition to a onetime analysis for each new housing start). To utilize the methods employed herein, uses can overlay these data points into either a self-developed (or existing) GIS to ensure we have the most accurate ground-level understanding of nutrient deficiencies available. Note: Keep in mind this data is only useful for users who've identified they'll be growing directly in the ground. For users indicating otherwise, a generic 'optimized mix' can be selected optionally with amendments made thereto for the variety of plant they will be cultivating.

An example of a soil composition selected for a specific geographic region identified by longitude and latitude is found below:

Soil composition manufactured for longitude −73.989722 and Latitude 40.691944.

| Default Block Composition For Location | | |
|---|---|---|
| Item (Internal Contents): | % Composition: | Contribution: |
| Peat Moss | 16.0% | Growing Medium |
| Pearlite | 29.0% | Moisture Control |
| Coco Coir | 17.5% | Growing Medium |
| Compost | 15.0% | Organic Matter |
| Manganese Greensand | 4.9% | Micronutrients |
| Bloodmeal | 1.8% | Nitrogen |
| Rock Phosphate | 2.8% | Phosphorus |
| Lime | 1.8% | pH Balance |
| Worm Castings | 1.2% | Fertilizer |
| Potassium Sulfate | 1.2% | Fertilizer |
| Azomite | 1.2% | Fertilizer |
| Alfalfa Meal | 0.7% | Fertilizer |
| Bonemeal | 2.1% | Phosphorus |
| Biochar | 0.4% | Carbon |
| Capsaicin | 0.0% | Insecticide |
| Chicken Manure | 1.1% | Fertilizer |
| Cotton Seed | 1.1% | Fertilizer |
| Kelp Meal | 0.7% | Micronutrients |
| Langeinite | 0.5% | Sulfur |
| Rock Dust | 0.5% | Remineralization |
| Tapoica | 0.4% | Seed Encasement |
| Zinc | 0.2% | |
| Feather Meal | 0.0% | Nitrogen |
| Total | 100.0% | |

A comparison of the above soil composition against the generic soil composition previously described can be readily ascertained. Starting from a default soil composition, the second column of cells above shows increases and decreases in percentages of particular components in the default soil composition. The purpose of increasing or decreasing a component's percentage of the soil composition is to cure or counteract deficiencies in the local soil. For the above example, data regarding the local soil compositions located at longitude −73.989722 and latitude 40.691944 has already been obtained and deficiencies in the underlying soil have been analyzed. Starting with the default soil composition described in an embodiment herein, a determination is made to increase or decrease the percentages of components in the default soil composition. This is done so that when a soil module containing the modified soil composition of the above table is introduced to the local soil at the specified longitude and latitude, the combination of the modified soil composition and the local soil produces a more ideal soil mixture for plant growth. For example, based on the soil analysis conducted at the specified longitude and latitude of this example, it is determined, for example, that a decrease in peat moss and an increase in pearlite would be beneficial for producing optimal plant growth and health when the modified soil composition in a soil module is placed in the local soil. The modified soil composition would then cure or counteract any deficiencies in the local soil such as a low amount of pearlite and at the same time not introduce too much of other soil composition components. As another example, the amount of bonemeal contributing phosphorus to the soil composition is increased in this customized soil composition as compared to the generic default soil composition of an embodiment disclosed herein in order to counteract a deficiency of phosphorous in the local soil at the identified longitude and latitude.

The soil taxonomy breakdown for this embodiment would be as follows:

| Soil Taxonomy Breakdown | |
|---|---|
| Soil Type: | Percentage: |
| Udepts | 37% |
| Orthents | 28% |
| Udults | 7% |
| Haplic Acrisols | 14% |
| Haplic Alisols | 8% |
| Haplic Luvisols | 6% |

Note: Compression multiple of 1.05.

Figure 12:
FIG. 12 shows an illustrative breakdown of solar analysis on a city block level.

FIG. 12 shows an illustrative breakdown of solar analysis on a city block level.

For example, the following data sources may be used in determining soil composition: sunlight levels, historical cloud specific lookup, solar monitoring, and solar monitoring.

Sunlight levels may be identified via the 'remote solar assessment' database, MapDwell, which gives weekly breakdowns for each user. In an embodiment, data is collected for each user of a soil module on a daily and granular level.

Historical cloud-specific lookup may be identified via a database such as, OpenWeatherMap (openweathermap.org). An algorithm may apply an absolute discount % in order to isolate cloud coverage. Further refinement of the system can be accomplished with local data gathering. SolarAnywhere is an example of another source of data. (solaranywhere.com/validation/methodology/in-depth/)

Solar assessment methods as described below can be utilized either individually or in combination.

One solar monitoring method may use LiDAR data and orthographic maps that provide discreet sunlight profiles for each square foot of most major cities. Estimates can be made from this data regarding the actual sunlight impact on a particular area.

For example, barometric pressure differences between the tops of buildings and trees and the altitude of the user's garden can be taken into account to adjust the level of sunlight that most likely impacts the gardening environment of the user.

Further, estimates can be made when a user positions their smartphone device in the location of their garden and the geographic location, topography of the surrounding area, altitude, and orientation can all be calculated by the smartphone. This additional information can be used to further estimate the amount of sunlight that impacts the gardening area.

A second solar monitoring method may use a sensor in the gardening area. This sensor monitors, records, and transmits the sunlight incident upon it. This information can then be used in further calculations to determine optimal plant life to grow in the garden, when to water, when to harvest, and the like.

A third solar monitoring method may include the use of a user's smartphone camera. Most smartphone devices comprise cameras. A user could place their smartphone in the gardening area. The smartphone would then use the internal camera to determine sunlight levels one or multiple times during the day. For example, the phone may take an image every 15 minutes for a 24-hour period to determine the sunlight at a particular location at various times during the day. This may be performed every day or every week to make the determination at various times during the year.

FIG. 13 shows an embodiment of a user interacting with a smartphone-based application for calculating the size and composition of a potential garden. Because of the modular nature of the soil modules, a garden area can be broken down into individual modules as shown in FIG. 13. The soil modules in this embodiment are square in shape and, accordingly, the displayed garden selection user interface shows a square garden selection area subdivided into squares. Alternatively, if the soil modules were a different shape then the display could be altered to account for the different soil module shape.

Figure 14:
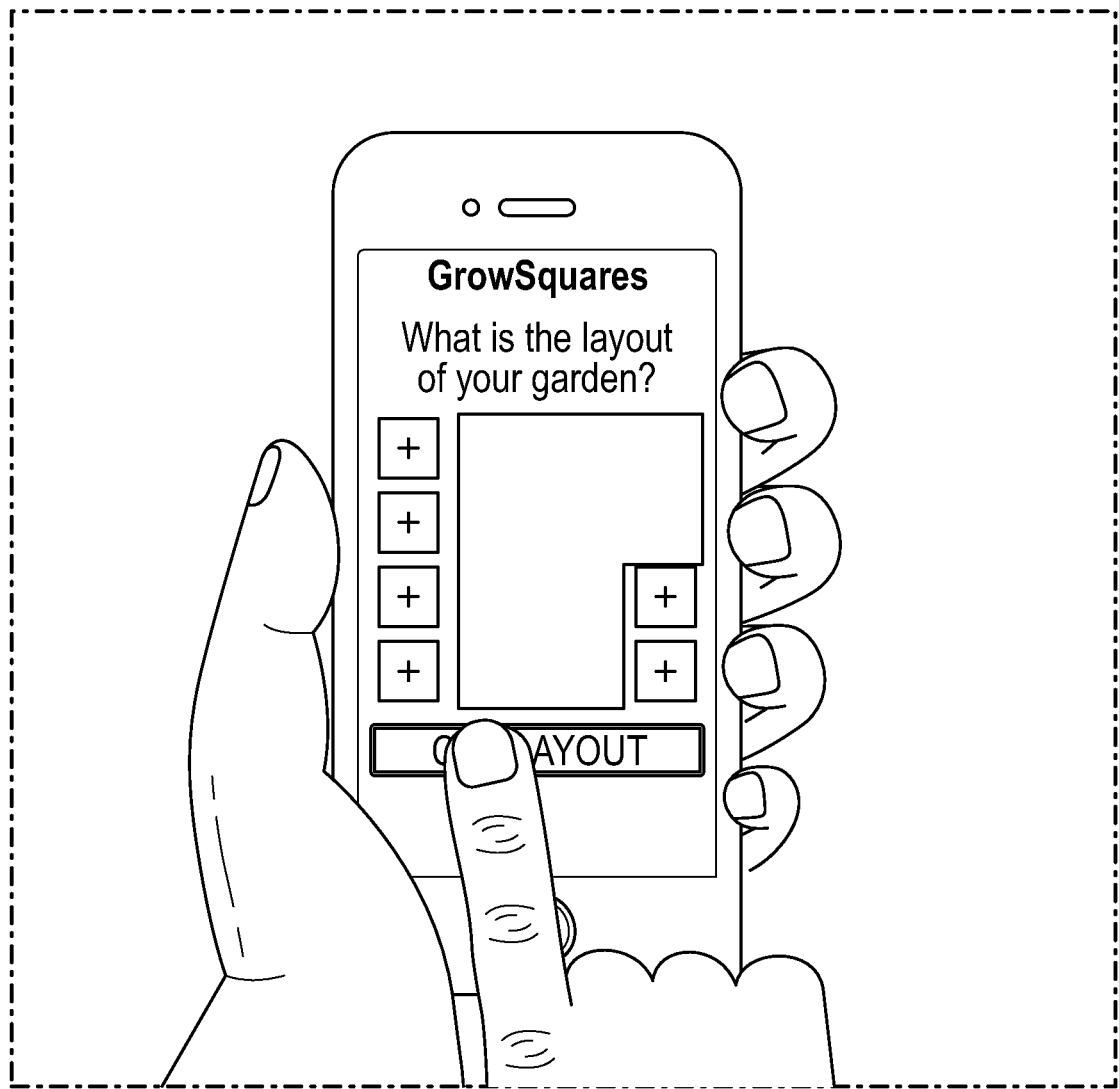
FIG. 14 shows an embodiment of a user selecting the size and layer of an intended garden using a smartphone-based application.

FIG. 14 shows an embodiment of a user selecting the size and layer of an intended garden using a smartphone-based application. As shown in FIG. 14, the user may select a variety of different sizes and configurations for the user's total garden layout. Because of the soil modules modular nature, the user may select nearly any combination of cells to construct their garden.

Figure 15:
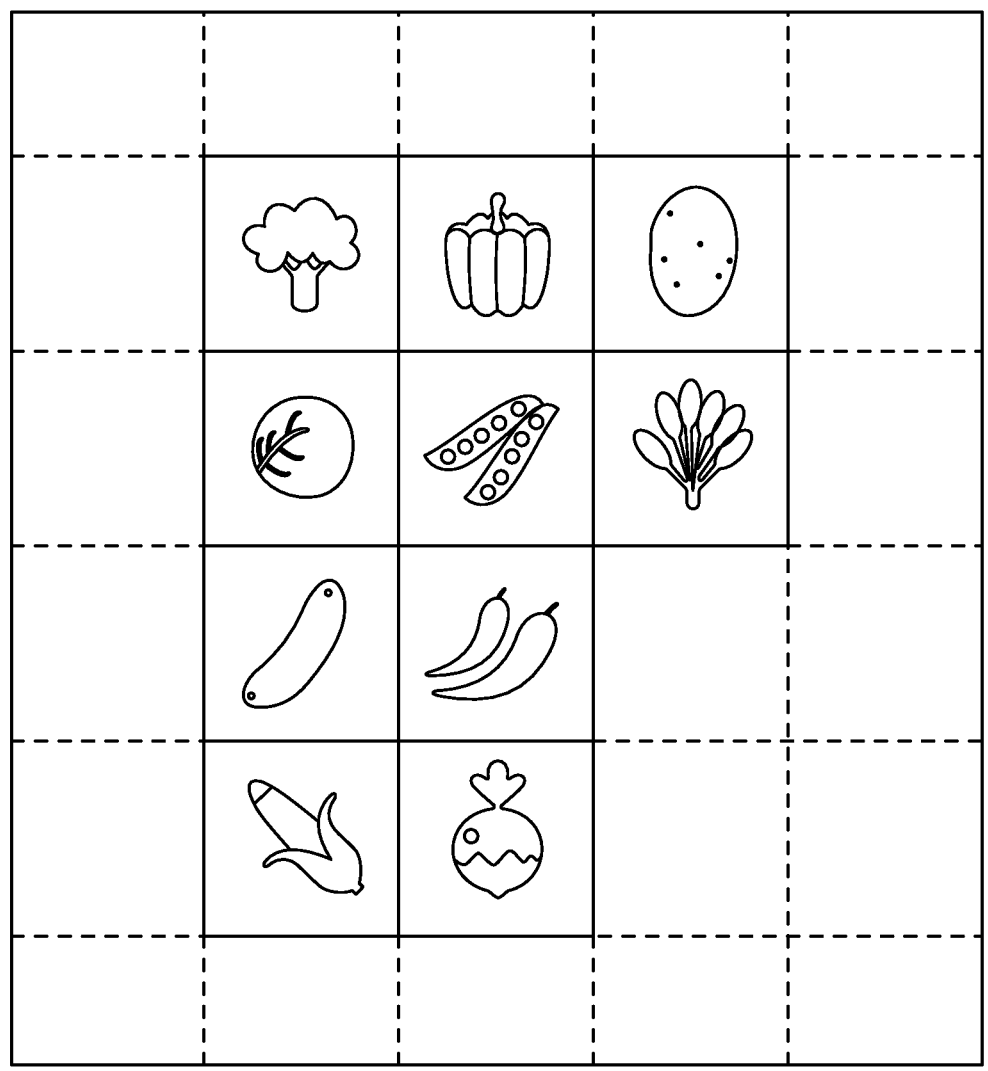
FIG. 15 shows an illustrative embodiment of vegetables being selected for growing in a potential garden and a method of arranging said vegetables.

FIG. 15 shows an illustrative embodiment of vegetables being selected for growing in a potential garden and a method of arranging said vegetables. Part of the method of arranging said vegetables is to not allow vegetables that potentially could impede one another's growth to be planted next to each other. A computer-based algorithm optimizes the selection process so that when multiple plants are selected for planting in a garden a neural network decision engine selects an arrangement to plant said soil modules that optimizes plant growth. In an embodiment of FIG. 19, the user has either (1) selected the plants to grow in their garden and/or (2) based on the inputted data from the user's geographic location and other variables (such as sunlight, wind, etc.), the computer network linked to the user's smartphone application has generated plant suggestions for the user. The computer network has also arranged the plants in the garden to optimize plant growth by positioning the soil modules, so the plant life contained therein will not interfere with surrounding plant life grown in surrounding soil modules.

FIG. 16 shows a perspective view of a self-contained soil module with label prepared for delivery to an end user. In an embodiment, the self-contained soil modules each contain one type of plant seed, contain a soil composition optimized for the type of plant seed contained therein, and include a label or identification marker so that the user can easily identify the type of plant the soil module contains. In FIG. 16 the soil module contains carrots and therefore is labeled with a carrot on the top of the soil module. Other soil modules can be labeled similarly in accordance with the type of plant contained therein.

Figure 17:
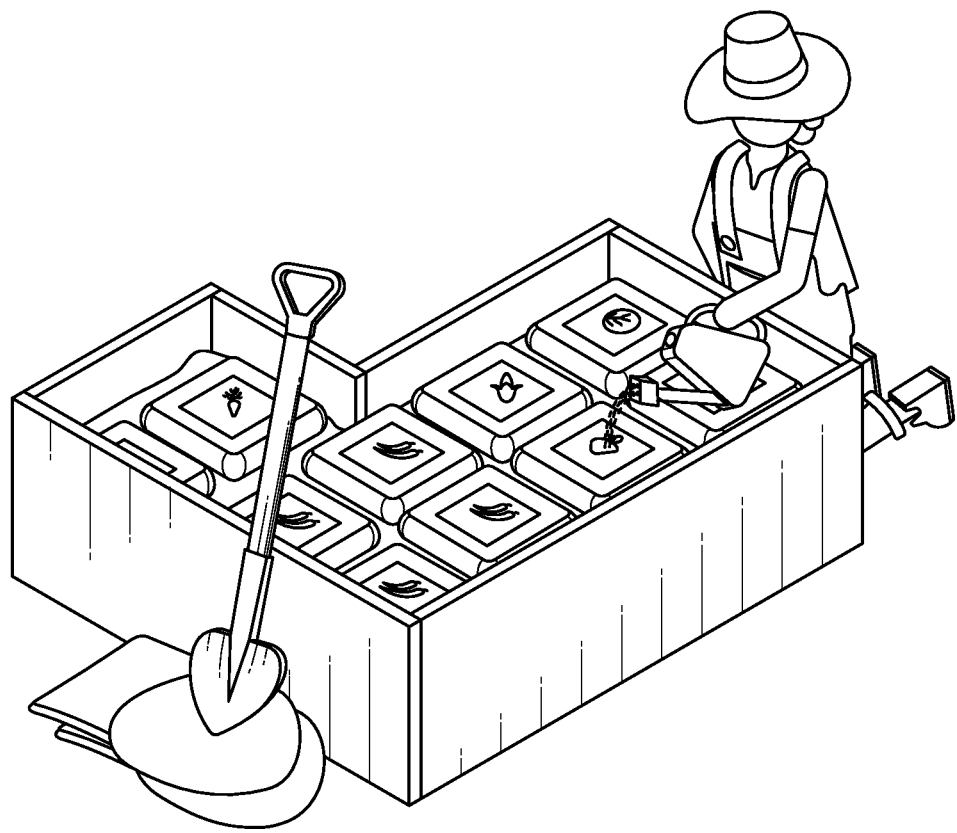
FIG. 17 shows a perspective view of an end user arranging a garden using multiple selfcontained soil modules each labeled and containing unique plant seeds.

FIG. 17 shows a perspective view of an end user planting a garden using multiple self contained soil modules each labeled and containing a unique plant seed. As shown in FIG. 17, an end user receives the soil modules each containing respective plants selected by the user. The size of the garden and the layout of the garden have already been inputted by the user such as the example shown in FIG. 19. The user is now capable of placing the individual self-contained soil modules at their respective locations in the garden as previously determined. Because of the modular nature of the soil modules the end user now has a variety of plant life capable of growing in an individually designed garden shape and size. Further, in an embodiment each soil module can contain a soil composition optimized to grow the plant contained therein. Further still, the soil composition of each soil module can be further modified to counteract a local soil composition found in the user's garden if the user is planting their garden directly into the local soil. If the garden is in an urban area and the garden is not being planted in the local soil, then it might not be necessary for further optimization of the soil composition beyond optimizing the soil for the type of plant grown within the soil module.

Figure 18:
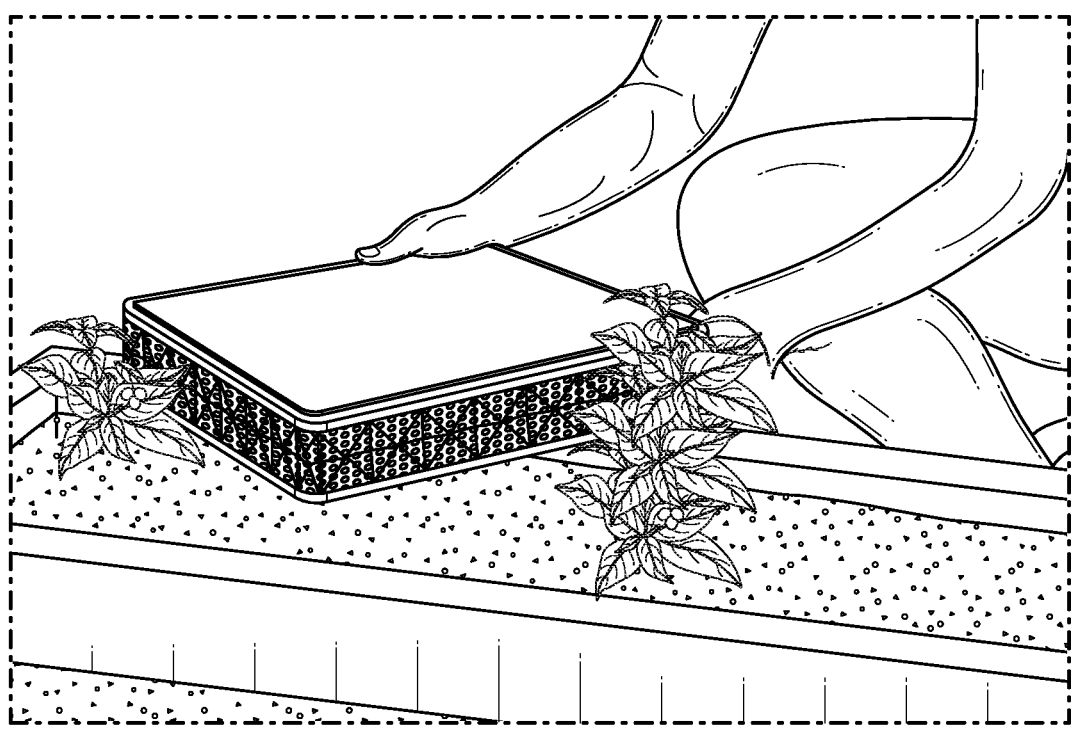
FIG. 18 shows a perspective view of an end user placing a self-contained soil module in an urban garden.

FIG. 18 shows a perspective view of an end user placing a self-contained soil module in an urban garden. As can be seen from FIG. 18, the soil module is self-contained and easily handled by the user. The soil module can be buried within local soil, artificial soil, or merely placed on top of the area that the user desires to grow their garden.

Figure 19:
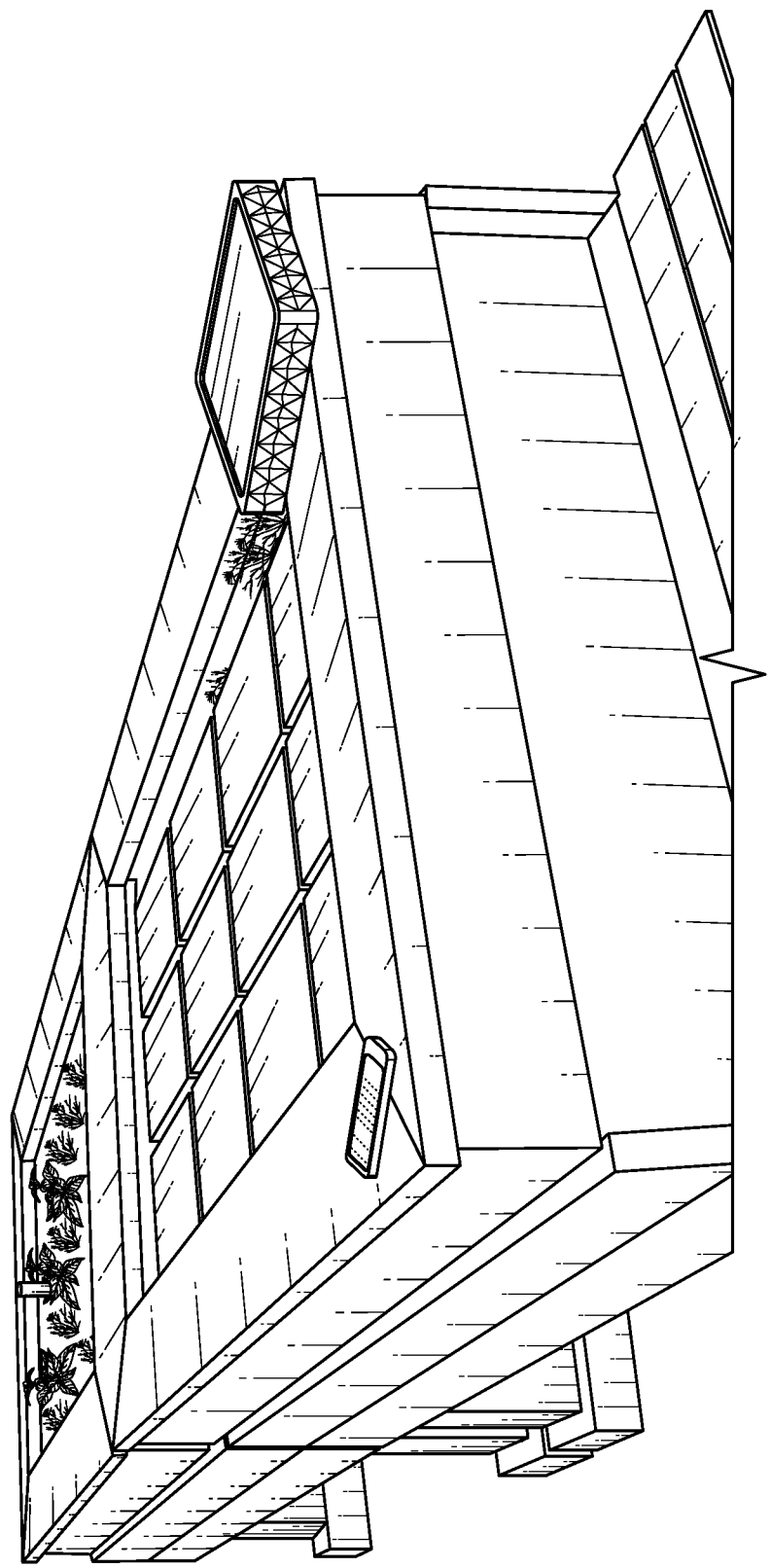
FIG. 19 shows a perspective view of an urban garden comprising columns and rows of self-contained soil modules.

FIG. 19 shows a perspective view of an urban garden comprising columns and rows of self-contained soil modules. The garden in FIG. 19 is shown on the rooftop of a building. The garden is a unique shape comprising a rectangle. The modular nature of the soil modules allows a user to select the garden shape to be three soil modules wide and four soil modules in length for a total of twelve soil modules. The soil modules allow a user to easily plant their garden by merely placing the soil modules in the desired location in the garden.

Figure 20:
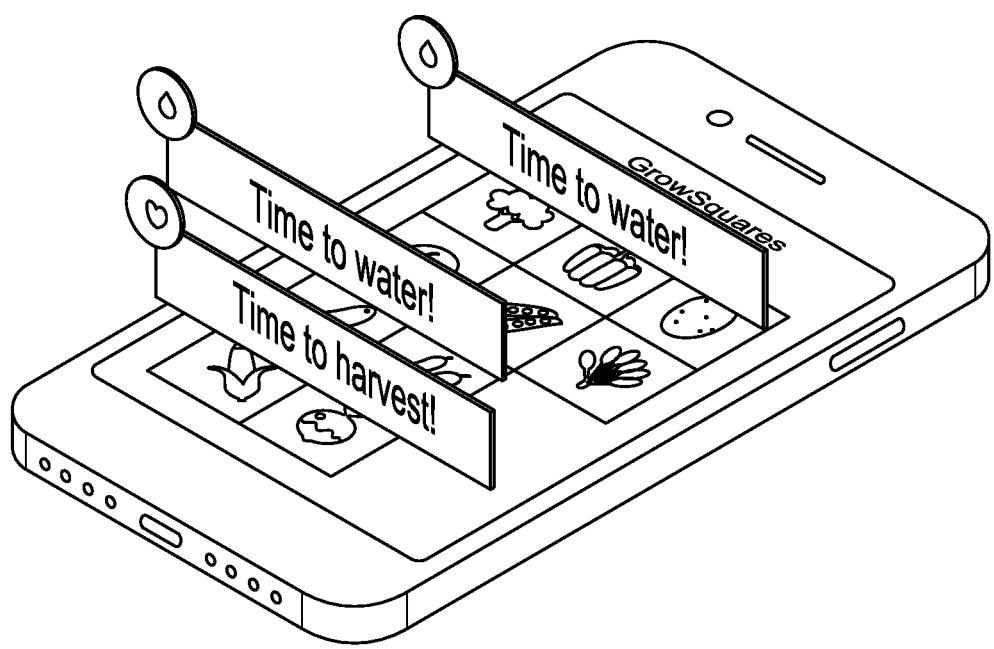
FIG. 20 shows an illustrative embodiment of end user notifications informing an end user when to water and harvest self-contained soil modules.

FIG. 20 shows an illustrative embodiment of end user notifications informing an end user when to water and harvest self-contained soil modules. In connection with the sensor data provided from the user's garden area or from data gathered from multiple sources, a network computer system can calculate and monitor the progress of an urban garden. The computer network can calculate based on the inputted or gathered data and the type of plant being grown when a particular plant in a particular soil module may require for example watering or harvesting. As shown in FIG. 20, notifications are being provided to an end user through a smartphone application that two of the ten soil modules require watering and one of the ten soil modules requires harvesting.

Figure 21:
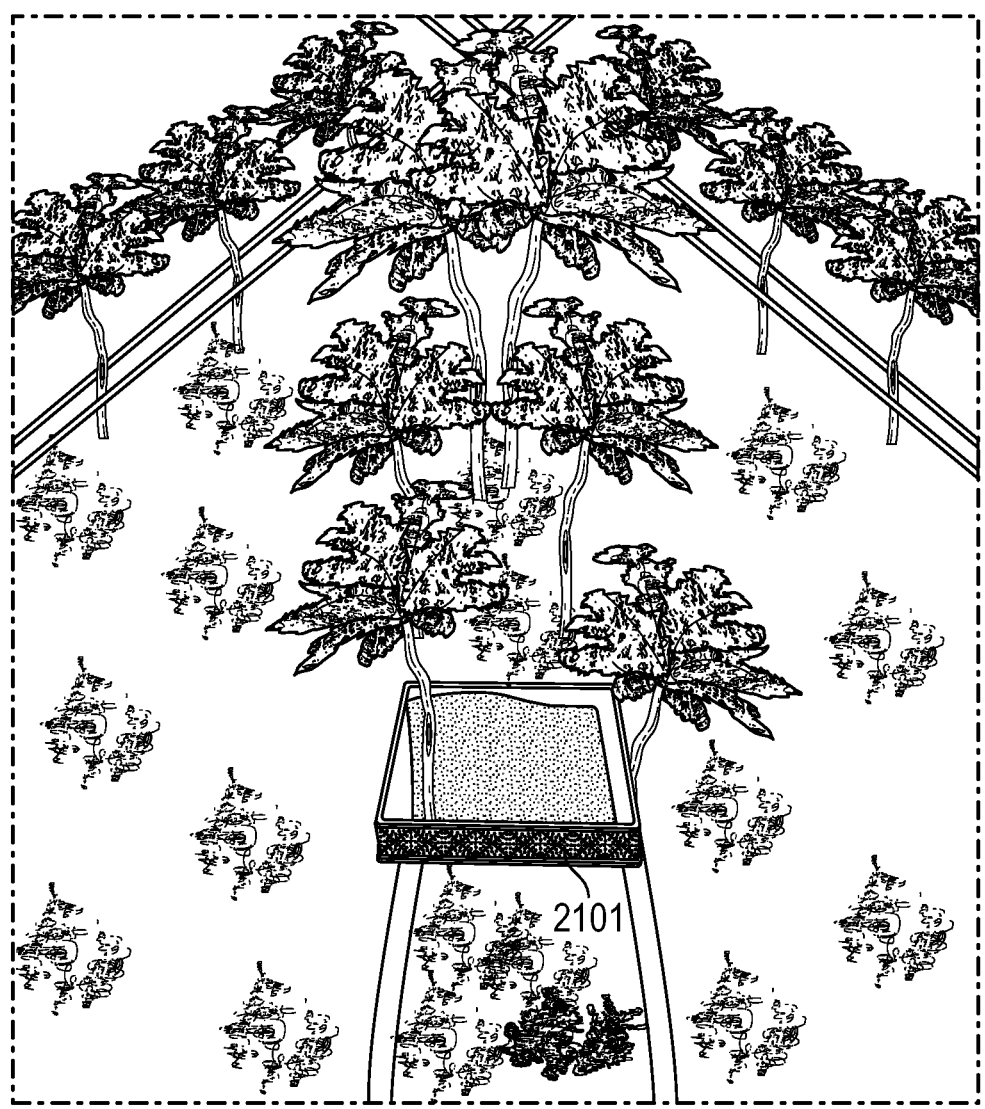
FIG. 21 shows a perspective view of a self-contained soil module wherein the plant life has grown through the module and developed into an adult plant.

FIG. 21 shows a perspective view of a self-contained soil module wherein the plant life has grown through the module and developed into an adult plant. Although the soil modules described herein are not required to be made out of purely biodegradable material, for example, the outer frame 101 being made of mycelium, the cellulose paper containing the soil composition and the entire structure being held together by biobased mastics, it is advantageous for the soil module to be biodegradable. As shown in FIG. 21, when the soil module is biodegradable, the plant seeds contained therein can take root in the soil composition and continue to grow through the bottom of the soil module and through the top of the soil module into a mature plant.

In embodiments, a computer network can be linked with an end user via for example a smartphone application. A user will have the ability to photograph their plant life growing in their garden from the soil modules and upload the images to the computer network. The network will be able to automatically identify the plant life being grown and identify the health of the plant life. The computer network will also be able to identify problems with the plant life. Further, the computer network can capture data from numerous users uploading data and images in order to improve the algorithms for growing plant life in a certain geographic region, in a soil composition provided in the soil modules, or under certain weather conditions.

The above described invention has been described in an illustrative manner. It is to be understood that the terminology which has been used is intended to be in the nature of words of description rather than of limitation. Many modifications and variations of the present invention are possible in light of the above teachings. It is therefore to be understood that within the scope of the appended claims the invention may be practiced otherwise than as specifically described.

Figure 22:
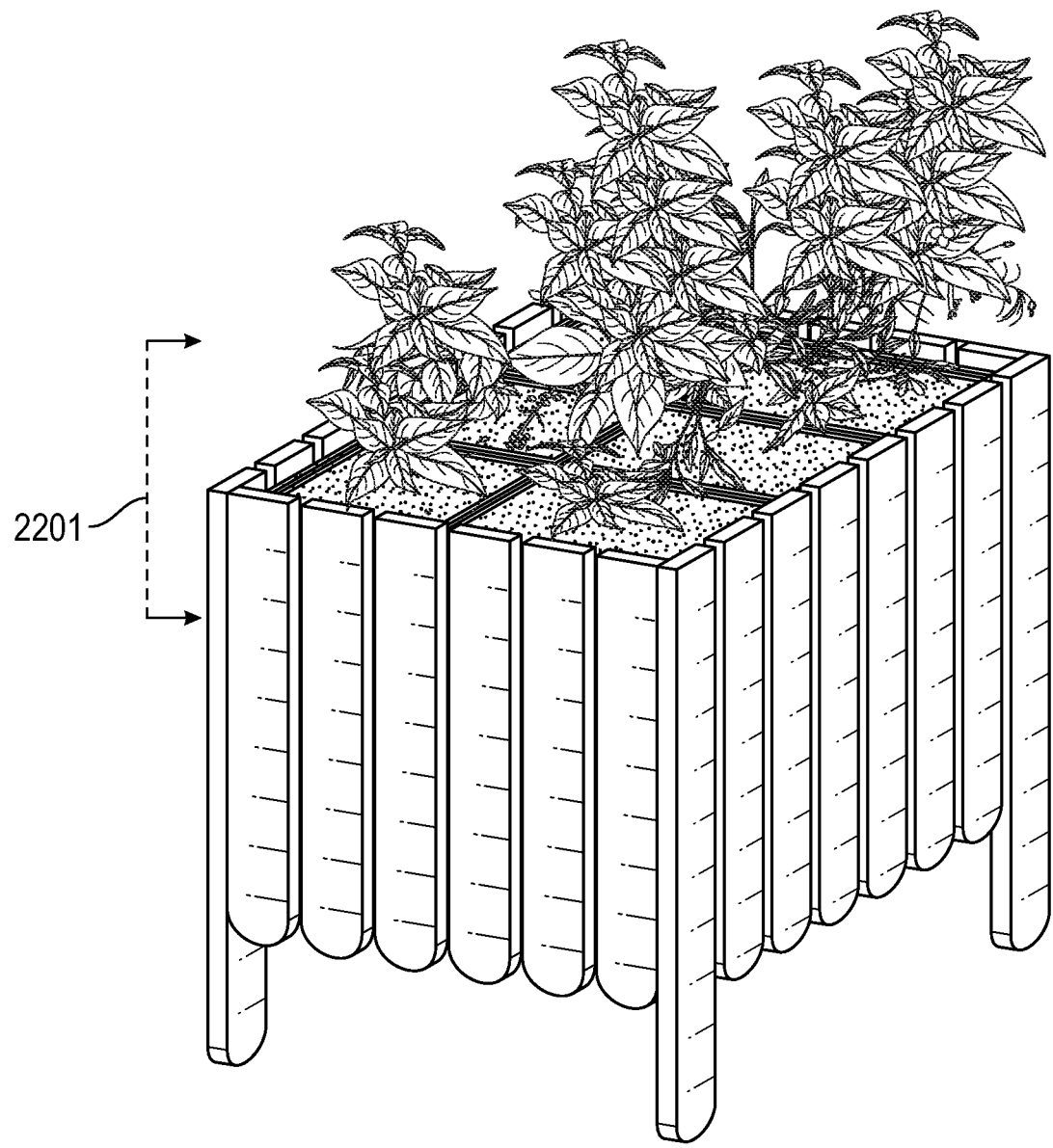
FIG. 22 shows a perspective view of an urban garden comprising columns and rows of self-contained soil modules.

FIG. 22 shows a perspective view of an urban garden comprising columns and rows of self-contained soil modules 2201. In this embodiment, the garden is a unique shape comprising a rectangle. The modular nature of the soil modules allows a user to select the garden shape to be two soil modules wide and three soil modules in length for a total of six soil modules. The soil modules allow a user to easily plant their garden by merely placing the self-contained soil module in the desired location in the garden.

What is claimed is:

1. A method of manufacturing a self-contained soil module, the method comprising:
    growing at least one mycelium sheet;
    cutting the at least one mycelium sheet into a bottom layer, a top layer, and one or more side walls;
    forming the bottom layer and the one or more side walls into a shape of a hollow container;
    binding the bottom layer and the one or more side walls using a biobased mastic;
    forming a soil composition; forming a soil packet comprising the steps of:
        placing the soil composition on top of a biodegradable wrapping;
        placing the biobased mastic along at least one edge of the biodegradable wrapping;
        sealing the soil packet by adhering the at least one edge of the biodegradable wrapping to a second edge of the biodegradable wrapping, such that the soil composition is disposed within the biodegradable wrapping;
        compressing the soil packet into the shape of the hollow container;
    placing the soil packet contained within the sealed biodegradable wrapping into the hollow container;
    placing and sealing the mycelium sheet top layer onto the one or more side walls with the biobased mastic; and
    injecting, at any of the preceding steps, at least one seed of at least one type of plant into at least one of the bottom layer, the top layer, the one or more side walls, or the soil packet.

2. The method of claim 1, wherein forming the soil composition comprises combining at least one of the following with the soil composition: peat moss, pearlite, coco coir, compost, manganese greensand, bloodmeal, rock phosphate, lime, worm castings, potassium sulfate, azomite, alfalfa meal, bonemeal, biochar, capsaicin, chicken manure, cotton seed, feather meal, kelp meal, langbeinite, rock dust, tapioca, vermiculite, zinc, and molybendum.

3. The method of claim 1, further comprising determining the local soil conditions of a garden location to determine the optimal soil composition for growing the at least one seed.

* * * * *